US009338398B2

(12) United States Patent
Kato

(10) Patent No.: US 9,338,398 B2
(45) Date of Patent: *May 10, 2016

(54) TRANSMISSION MANAGEMENT SYSTEM, TRANSMISSION SYSTEM, PROGRAM, PROGRAM SUPPLY SYSTEM, AND MAINTENANCE SYSTEM

(71) Applicant: RICOH COMPANY, LTD., Ohta-ku (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,146

(22) Filed: Apr. 16, 2015

(65) Prior Publication Data

US 2015/0222855 A1 Aug. 6, 2015

Related U.S. Application Data

(63) Continuation of application No. 14/008,228, filed as application No. PCT/JP2012/059132 on Mar. 28, 2012, now Pat. No. 9,035,994.

(30) Foreign Application Priority Data

Mar. 21, 2011 (JP) ................................ 2011-079569
Aug. 31, 2011 (JP) ................................ 2011-189389

(51) Int. Cl.
*H04N 7/15* (2006.01)
*H04M 3/56* (2006.01)
*H04N 7/14* (2006.01)

(52) U.S. Cl.
CPC ................. *H04N 7/15* (2013.01); *H04M 3/567* (2013.01); *H04N 7/147* (2013.01); *G06F 2213/0038* (2013.01)

(58) Field of Classification Search
CPC .......... H04M 3/567; H04N 7/147; H04N 7/15
USPC ......................... 348/14.08; 370/260; 709/204
See application file for complete search history.

(56) References Cited

U.S. PATENT DOCUMENTS

2007/0011313 A1 1/2007 Xu
2011/0264813 A1 10/2011 Nair et al.

FOREIGN PATENT DOCUMENTS

CN 1642263 A 7/2005
CN 1976435 A 6/2007

(Continued)

OTHER PUBLICATIONS

International Search Report Issued Jul. 10, 2012 in PCT/JP2012/059132 Filed Mar. 28, 2012.

(Continued)

*Primary Examiner* — Creighton Smith
(74) *Attorney, Agent, or Firm* — Oblon, McClelland, Maier & Neustadt, L.L.P.

(57) ABSTRACT

A transmission management system that manages image communications among a plurality of transmission terminals capable of performing at least voice communications. The transmission system includes a terminal management section that manages image communications state information indicating an image communications state of each of the transmission terminals for each terminal identification information for identifying each transmission terminal, a creation section that creates a specified communications control message causing the specified transmission terminal to control the image communications in accordance with the image communications state information, and a transmitting section that transmits the created communications control message to the transmission terminal caused to control the image communications.

15 Claims, 24 Drawing Sheets

(56) References Cited

FOREIGN PATENT DOCUMENTS

| | | | |
|---|---|---|---|
| EP | 1 705 912 | A1 | 9/2006 |
| JP | 2000-236326 | | 8/2000 |
| JP | 2004-13632 | | 1/2004 |
| JP | 2007-195136 | | 8/2007 |
| JP | 2008-131412 | | 6/2008 |
| JP | 2011-59675 | | 3/2011 |
| JP | 2012-075073 | | 4/2012 |
| WO | WO 2010/032989 | A2 | 3/2010 |

OTHER PUBLICATIONS

Extended European Search Report issued Aug. 29, 2014, in European Patent Application No. 12763376.6.

Office Action mailed Jan. 4, 2016 in Chinese Patent Application No. 201280015714.9 (with English Translation).

TRANSMISSION SYSTEM
1
AREA A
AREA B
RELAYING APPARATUS
30a
30b
30c
30d
COMMUNICATIONS NETWORK
2
TRANSMISSION MANAGEMENT SYSTEM
50
LAN
2a
2b
2c
2d
DEDICATED LINE
2ab
2cd
INTERNET
2i
ROUTER
70a
70b
70c
70d
70ab
70cd
PROGRAM SUPPLY SYSTEM
90
MAINTENANCE SYSTEM
100
10aa
10ab
10ac
10ba
10bb
10bc
10ca
10cb
10cc
10da
10db
10dc
120aa
120ab
120ac
120ba
120bb
120bc
120ca
120cb
120cc
120da
120db
120dc
(1.1.1.2)
(1.1.2.2)
(1.1.2.3)
(1.2.1.1)
(1.2.1.2)
(1.2.1.3)
(1.2.1.4)
(1.2.1.5)
(1.2.2.1)
(1.2.2.2)
(1.2.2.3)
(1.2.2.4)
(1.2.2.5)
(1.2.3.1)
(1.3.1.1)
(1.3.1.2)
(1.3.1.3)
(1.3.1.4)
(1.3.1.5)
(1.3.2.2)
(1.3.2.3)
(1.3.2.4)
(1.3.2.5)
(1.3.3.1)

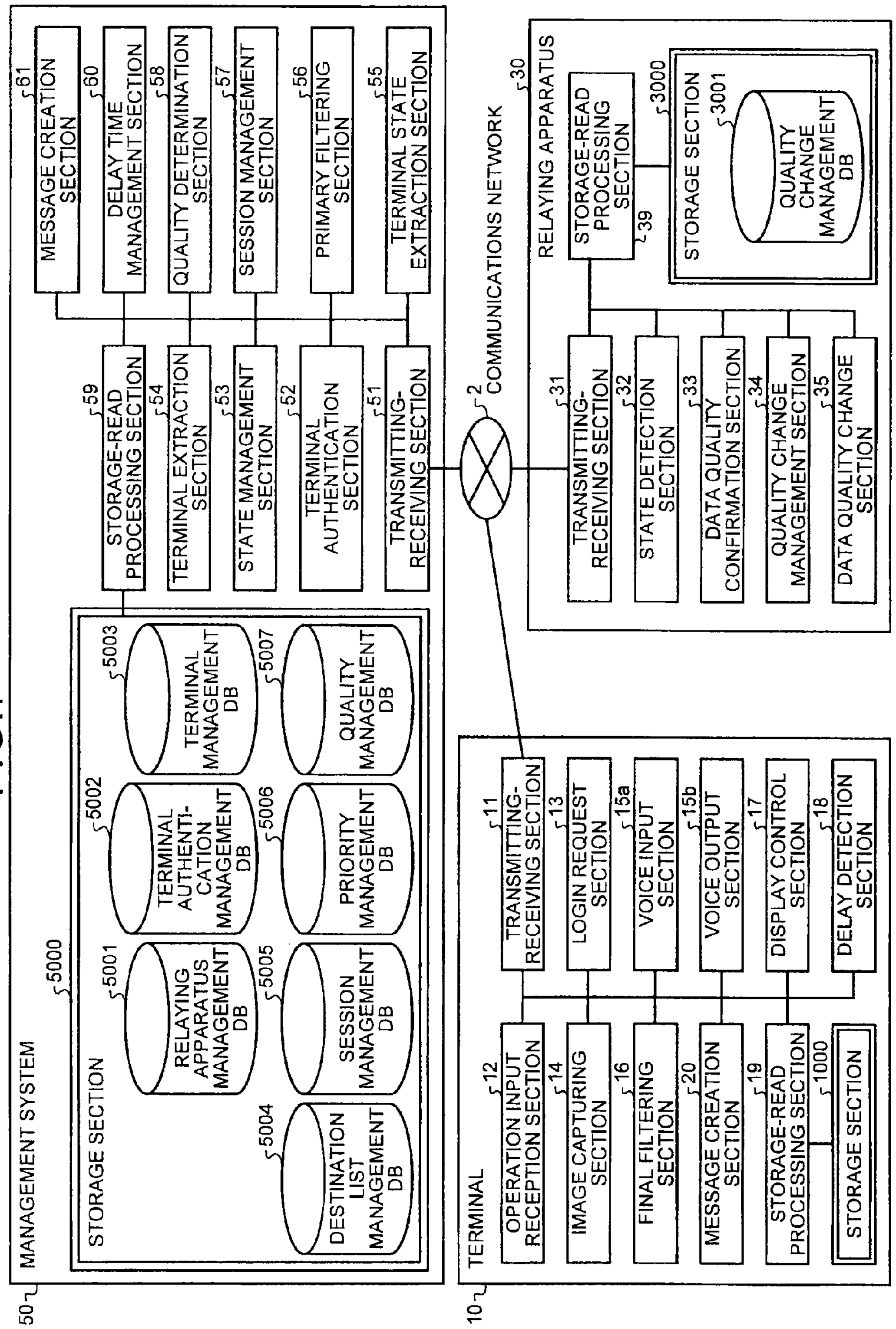
FIG.7
50
MANAGEMENT SYSTEM
5000
STORAGE SECTION
5001
RELAYING APPARATUS MANAGEMENT DB
5002
TERMINAL AUTHENTI-CATION MANAGEMENT DB
5003
TERMINAL MANAGEMENT DB
5004
DESTINATION LIST MANAGEMENT DB
5005
SESSION MANAGEMENT DB
5006
PRIORITY MANAGEMENT DB
5007
QUALITY MANAGEMENT DB
59
STORAGE-READ PROCESSING SECTION
54
TERMINAL EXTRACTION SECTION
53
STATE MANAGEMENT SECTION
52
TERMINAL AUTHENTICATION SECTION
51
TRANSMITTING-RECEIVING SECTION
61
MESSAGE CREATION SECTION
60
DELAY TIME MANAGEMENT SECTION
58
QUALITY DETERMINATION SECTION
57
SESSION MANAGEMENT SECTION
56
PRIMARY FILTERING SECTION
55
TERMINAL STATE EXTRACTION SECTION
2
COMMUNICATIONS NETWORK
30
RELAYING APPARATUS
39
STORAGE-READ PROCESSING SECTION
3000
STORAGE SECTION
3001
QUALITY CHANGE MANAGEMENT DB
31
TRANSMITTING-RECEIVING SECTION
32
STATE DETECTION SECTION
33
DATA QUALITY CONFIRMATION SECTION
34
QUALITY CHANGE MANAGEMENT SECTION
35
DATA QUALITY CHANGE SECTION
10
TERMINAL
12
OPERATION INPUT RECEPTION SECTION
14
IMAGE CAPTURING SECTION
16
FINAL FILTERING SECTION
20
MESSAGE CREATION SECTION
19
STORAGE-READ PROCESSING SECTION
1000
STORAGE SECTION
11
TRANSMITTING-RECEIVING SECTION
13
LOGIN REQUEST SECTION
15a
VOICE INPUT SECTION
15b
VOICE OUTPUT SECTION
17
DISPLAY CONTROL SECTION
18
DELAY DETECTION SECTION

FIG.10

QUALITY CHANGE MANAGEMENT TABLE

| IP ADDRESS OF RELAY DESTINATION TERMINAL | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.11

RELAYING APPARATUS MANAGEMENT TABLE

| RELAYING APPARATUS ID | OPERATION STATE | RECEIVING DATE | IP ADDRESS OF RELAYING APPARATUS | MAXIMUM DATA TRANSMISSION SPEED [Mbps] |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | ONLINE | 2009.11.10.13:20 | 1.3.1.2 | 100 |
| 111d | ONLINE | 2009.11.10.13:30 | 1.3.2.2 | 10 |

FIG.12

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.13

TERMINAL MANAGEMENT TABLE

| TERMINAL ID | DESTINATION NAME | OPERATION STATE | IMAGE COMMUNICATIONS STATE | RECEIVING DATE | IP ADDRESS OF TERMINAL |
|---|---|---|---|---|---|
| 01aa | AA TERMINAL, TOKYO BUSINESS OFFICE, JAPAN | ONLINE (TELEPHONE CONVERSATION IS ENABLED) | ON | 2009.11.10.13:40 | 1.2.1.3 |
| 01ab | AB TERMINAL, TOKYO BUSINESS OFFICE, JAPAN | OFFLINE | DC | 2009.11.09.12:00 | 1.2.1.4 |
| ... | ... | ... | ... | ... | ... |
| 01ba | BA TERMINAL, OSAKA BUSINESS OFFICE, JAPAN | ONLINE (TEMPORARY HALTED) | OFF | 2009.11.10.13:45 | 1.2.2.3 |
| 01bb | BB TERMINAL, OSAKA BUSINESS OFFICE, JAPAN | ONLINE (TELEPHONE CONVERSATION IS ENABLED) | ON | 2009.11.10.13:50 | 1.2.2.4 |
| ... | ... | ... | ... | ... | ... |
| 01ca | CA TERMINAL, NEW YORK BUSINESS OFFICE, USA | OFFLINE | DC | 2009.11.10.12:45 | 1.3.1.3 |
| 01cb | CB TERMINAL, NEW YORK BUSINESS OFFICE, USA | ONLINE (BUSY) | NA | 2009.11.10.13:55 | 1.3.1.4 |
| ... | ... | ... | ... | ... | ... |
| 01da | DA TERMINAL, WASHINGTON, D.C. BUSINESS OFFICE, USA | ONLINE (BUSY) | NA | 2009.11.08.12:45 | 1.3.2.3 |
| 01db | DB TERMINAL, WASHINGTON, D.C. BUSINESS OFFICE, USA | OFFLINE | OFF | 2009.11.10.12:45 | 1.3.2.4 |
| ... | ... | ... | ... | ... | ... |

FIG.14

DESTINATION LIST MANAGEMENT TABLE

| REQUEST ORIGIN TERMINAL ID | DESTINATION TERMINAL ID |
|---|---|
| 01aa | 01ab, 01ba, 01bb |
| 01ab | 01aa, 01ca, 01cb |
| 01ba | 01aa, 01ca, 01cb, 01da, 01db |
| ... | ... |
| 01db | 01aa, 01ba |

FIG.15

SESSION MANAGEMENT TABLE

| SELECTION SESSION ID | RELAYING APPARATUS ID | REQUEST ORIGIN TERMINAL ID | DESTINATION TERMINAL ID | DELAY TIME [ms] | DELAY INFORMATION RECEIVING DATE |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.16

ADDRESS PRIORITY MANAGEMENT TABLE

| SAME/DIFFERENT IN DOT ADDRESS | ADDRESS PRIORITY |
|---|---|
| SAME.SAME.SAME.DIFFERENT | 5 |
| SAME.SAME.DIFFERENT.- | 3 |
| SAME.DIFFERENT.-.- | 1 |
| DIFFERENT.-.-.- | 0 |

FIG.17

TRANSMISSION SPEED PRIORITY MANAGEMENT TABLE

| MAXIMUM DATA TRANSMISSION SPEED AT RELAYING APPARATUS [Mbps] | TRANSMISSION SPEED PRIORITY |
|---|---|
| 1000 OR MORE | 5 |
| FROM 100 TO 1000 | 3 |
| FROM 10 TO 100 | 1 |
| LESS THAN 10 | 0 |

FIG.18

QUALITY MANAGEMENT TABLE

| DELAY TIME [ms] | IMAGE QUALITY OF IMAGE DATA (QUALITY OF IMAGE) |
|---|---|
| FROM 0 TO 100 | HIGH IMAGE QUALITY |
| FROM 100 TO 300 | MEDIUM IMAGE QUALITY |
| FROM 300 TO 500 | LOW IMAGE QUALITY |
| 500 OR MORE | (HALTED) |

FIG.23

| RELAYING APPARATUS ID | ADDRESS PRIORITY | | POINT OF TRANSMISSION SPEED PRIORITY | TOTAL POINT |
|---|---|---|---|---|
| | POINT WITH RESPECT TO TERMINAL 10aa | POINT WITH RESPECT TO TERMINAL 10db | | |
| 111a | 5 | 1 | 3 | 8 |
| 111b | 3 | 1 | 5 | 8 |
| 111c | - | - | - | - |
| 111d | 1 | 5 | 1 | 6 |

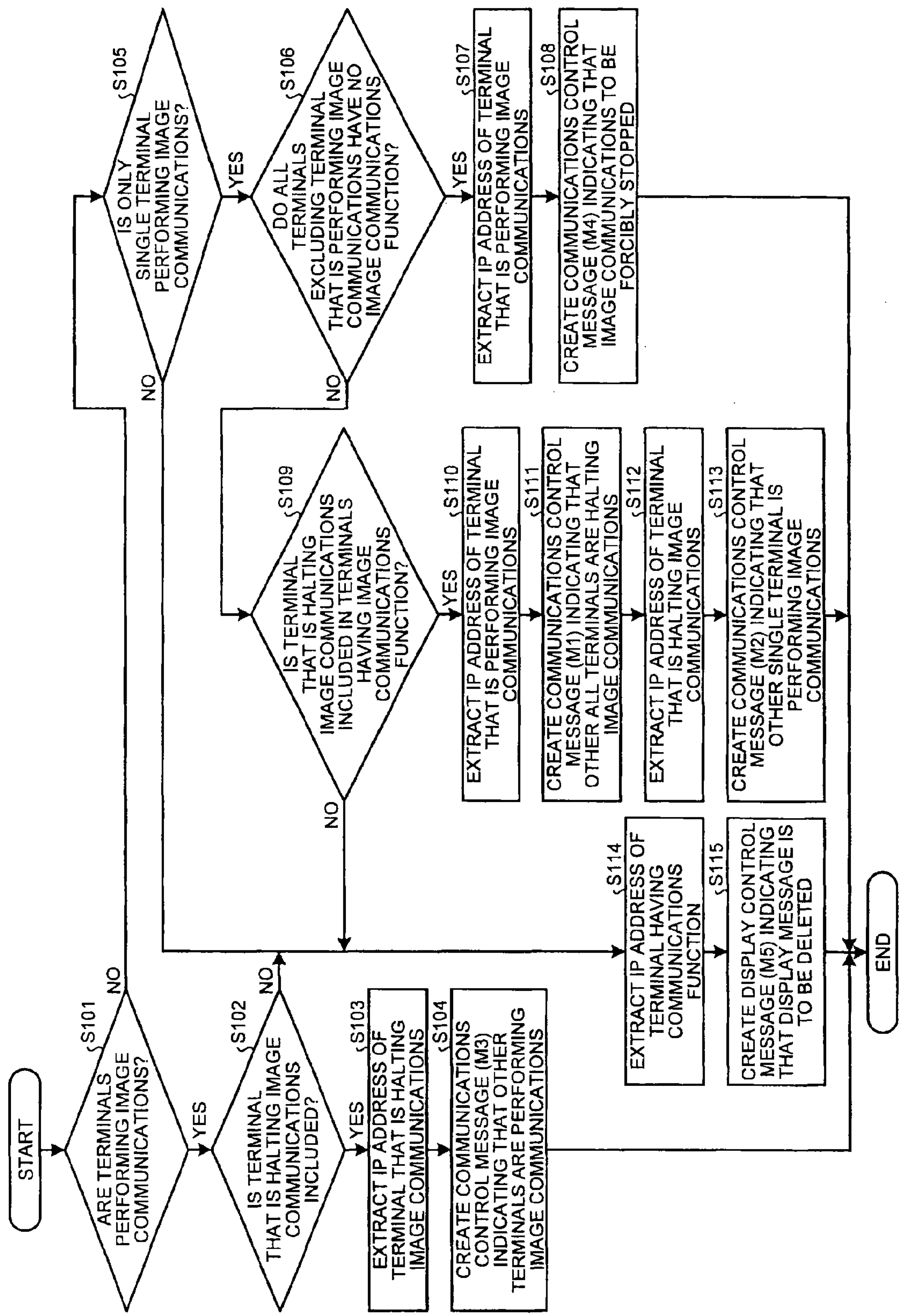
FIG.28
START
ARE TERMINALS PERFORMING IMAGE COMMUNICATIONS?
S101
YES
NO
IS TERMINAL THAT IS HALTING IMAGE COMMUNICATIONS INCLUDED?
S102
YES
NO
EXTRACT IP ADDRESS OF TERMINAL THAT IS HALTING IMAGE COMMUNICATIONS
S103
CREATE COMMUNICATIONS CONTROL MESSAGE (M3) INDICATING THAT OTHER TERMINALS ARE PERFORMING IMAGE COMMUNICATIONS
S104
IS ONLY SINGLE TERMINAL PERFORMING IMAGE COMMUNICATIONS?
S105
YES
NO
DO ALL TERMINALS EXCLUDING TERMINAL THAT IS PERFORMING IMAGE COMMUNICATIONS HAVE NO IMAGE COMMUNICATIONS FUNCTION?
S106
YES
NO
EXTRACT IP ADDRESS OF TERMINAL THAT IS PERFORMING IMAGE COMMUNICATIONS
S107
CREATE COMMUNICATIONS CONTROL MESSAGE (M4) INDICATING THAT IMAGE COMMUNICATIONS TO BE FORCIBLY STOPPED
S108
IS TERMINAL THAT IS HALTING IMAGE COMMUNICATIONS INCLUDED IN TERMINALS HAVING IMAGE COMMUNICATIONS FUNCTION?
S109
YES
NO
EXTRACT IP ADDRESS OF TERMINAL THAT IS PERFORMING IMAGE COMMUNICATIONS
S110
CREATE COMMUNICATIONS CONTROL MESSAGE (M1) INDICATING THAT OTHER ALL TERMINALS ARE HALTING IMAGE COMMUNICATIONS
S111
EXTRACT IP ADDRESS OF TERMINAL THAT IS HALTING IMAGE COMMUNICATIONS
S112
CREATE COMMUNICATIONS CONTROL MESSAGE (M2) INDICATING THAT OTHER SINGLE TERMINAL IS PERFORMING IMAGE COMMUNICATIONS
S113
EXTRACT IP ADDRESS OF TERMINAL HAVING COMMUNICATION FUNCTION
S114
CREATE DISPLAY CONTROL MESSAGE (M5) INDICATING THAT DISPLAY MESSAGE IS TO BE DELETED
S115
END

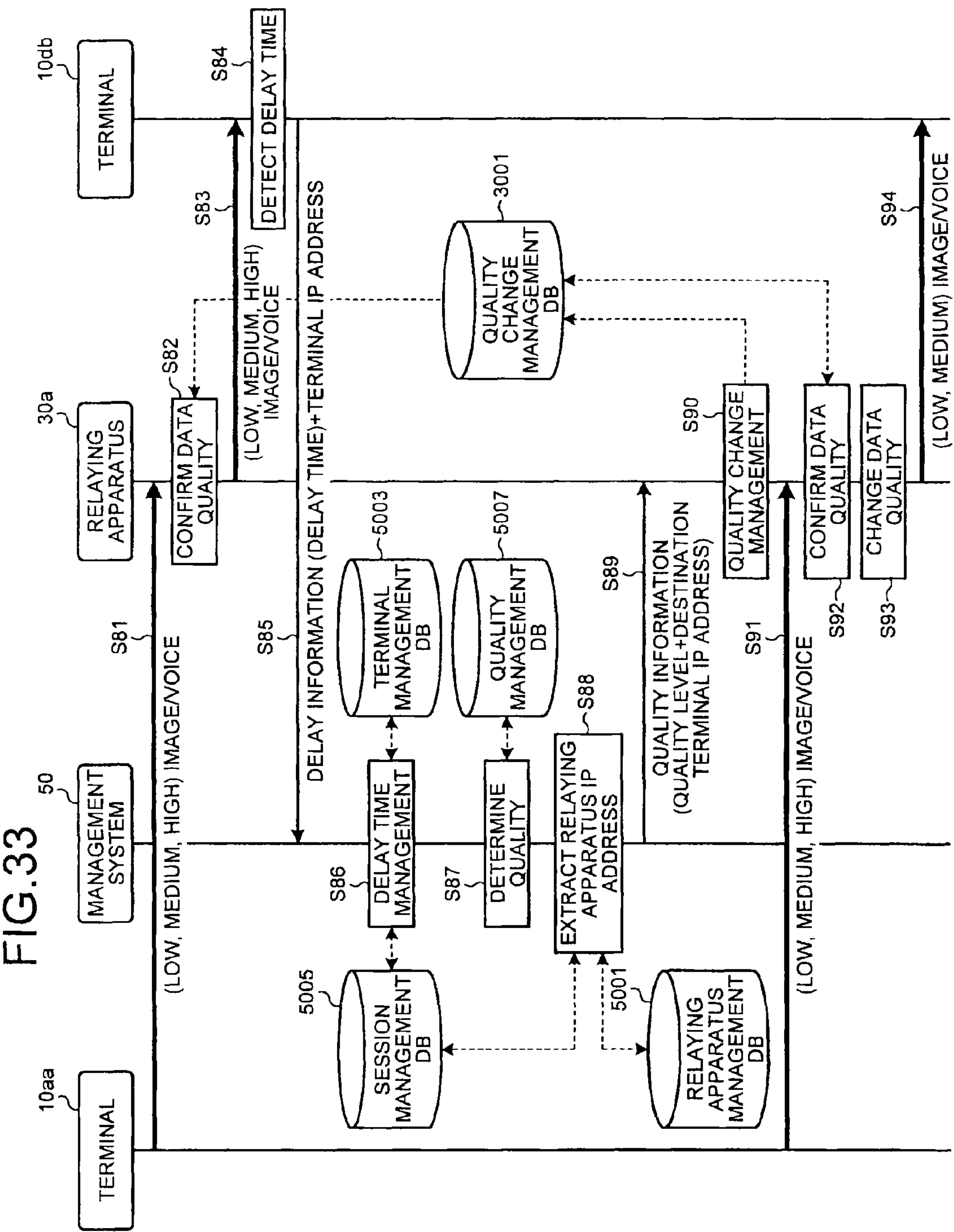
FIG.33
TERMINAL
10aa
MANAGEMENT SYSTEM
50
RELAYING APPARATUS
30a
TERMINAL
10db
S81
(LOW, MEDIUM, HIGH) IMAGE/VOICE
S82
CONFIRM DATA QUALITY
S83
(LOW, MEDIUM, HIGH) IMAGE/VOICE
S84
DETECT DELAY TIME
S85
DELAY INFORMATION (DELAY TIME)+TERMINAL IP ADDRESS
S86
DELAY TIME MANAGEMENT
5005
SESSION MANAGEMENT DB
5003
TERMINAL MANAGEMENT DB
S87
DETERMINE QUALITY
5007
QUALITY MANAGEMENT DB
S88
EXTRACT RELAYING APPARATUS IP ADDRESS
5001
RELAYING APPARATUS MANAGEMENT DB
S89
QUALITY INFORMATION (QUALITY LEVEL+DESTINATION TERMINAL IP ADDRESS)
S90
QUALITY CHANGE MANAGEMENT
3001
QUALITY CHANGE MANAGEMENT DB
S91
(LOW, MEDIUM, HIGH) IMAGE/VOICE
S92
CONFIRM DATA QUALITY
S93
CHANGE DATA QUALITY
S94
(LOW, MEDIUM) IMAGE/VOICE

TRANSMISSION MANAGEMENT SYSTEM, TRANSMISSION SYSTEM, PROGRAM, PROGRAM SUPPLY SYSTEM, AND MAINTENANCE SYSTEM

CROSS-REFERENCE TO RELATED APPLICATIONS

The present application is a continuation application of U.S. patent application Ser. No. 14/008,228, filed Sep. 27, 2013, which is a National Stage application of PCT/JP2012/059132 filed Mar. 28, 2012, and claims priority to Japanese Patent Application Nos. 2011-189389 filed Aug. 31, 2011, and 2011-079569 filed Mar. 31, 2011. The entire contents of the above-identified applications are incorporated herein by reference.

TECHNICAL FIELD

The present invention relates to an invention for managing communications of content data used for having conversations among a plurality of transmission terminals.

BACKGROUND ART

One of the examples of a transmission system that transmits and receives content data among a plurality of transmission terminals through a relaying apparatus is a television conference system in which a television conference is held though a communications network such as the Internet. The need for such a television conference system has been increasing because of the recent demand for reduction in cost and time taken for business trips. In such a television conference system, a plurality of television conference terminals, which are examples of the transmission terminals, are used. A television conference can proceed by transmitting and receiving image data and voice data among the television conference terminals.

There are inadequate environments for a television conference, such as private places including home. As a countermeasure for a television conference held under such an environment, a transmission terminal has been developed that acquires a state of the environment under which another transmission terminal on the other parties' side is installed and controls image communications or voice communications (refer to Japanese Patent Application Laid-open No. 2008-131412).

The transmission terminal disclosed in Japanese Patent Application Laid-open No. 2008-131412, however, controls the image communications or the voice communications simply by taking into consideration the surrounding environment of the transmission terminal on the other parties' side, but does not control the image communications by taking into consideration the image communications state of the transmission terminal on the other parties' side. That is, the transmission terminal disclosed in Japanese Patent Application Laid-open No. 2008-131412 does not control the image communications by taking into consideration the image communications state, such as the transmission terminal on the other parties' side has a voice communications function but has no image communications function or the transmission terminal on the other parties' side has an image communications function but is not performing image communications. Accordingly, when the transmission terminal performs image communications with the transmission terminal on the other parties' side in the above-described state, the image communications will run to waste because the transmission terminal on the other parties' side cannot respond to the image communications.

DISCLOSURE OF INVENTION

A transmission management system manages image communications among a plurality of transmission terminals capable of performing at least voice communications. The transmission management system includes a terminal management section that manages image communications state information indicating an image communications state of each of the transmission terminals for each terminal identification information for identifying each transmission terminal, a creation section that creates a specified communications control message causing the specified transmission terminal to control the image communications in accordance with the image communications state information, and a transmitting section that transmits the created communications control message to the transmission terminal caused to control the image communications among the transmission terminals.

According to the aforementioned transmission management system, in a first case in which the image communications state information indicates that a single transmission terminal is performing image communications and one or more other transmission terminals are halting image communications among the transmission terminals, the creation section may create a first communications control message indicating that the one or more other transmission terminals are halting image communications and a second communications control message indicating that the single transmission terminal is performing image communications, and the transmitting section may transmit the first communications control message to the single transmission terminal that is performing image communications and the second communications control message to the one or more other transmission terminals that are halting image communications.

According to the aforementioned transmission management system, in a second case in which the image communications state information indicates that more than one the transmission terminals are performing image communications and one or more other transmission terminals are halting image communications among the transmission terminals, the creation section may create a third communications control message indicating that the more than one transmission terminals are performing image communications, and the transmitting section may transmit the third communications control message to the one or more other transmission terminals that are halting image communications.

According to the aforementioned transmission management system, in a third case in which the image communications state information indicates that a single transmission terminal is performing image communications and one or more other transmission terminals have no image communications function among the transmission terminals, the creation section may create a fourth communications control message indicating that the image communications is to be forcibly stopped, and the transmitting section may transmit the fourth communications control message to the single transmission terminal that is performing image communications.

According to the aforementioned transmission management system, in a fourth case in which the image communications state information does not correspond to any of the first to the third cases, the creation section may create a display control message indicating that specified display messages displayed on the transmission terminals are to be deleted, and the transmitting section may transmit the display control message to the transmission terminals.

A transmission system includes the aforementioned transmission management system and the aforementioned transmission terminals. Each of the transmission terminals includes a receiving section that receives a communications control message transmitted from the transmission management system, and a display control section that causes a specified display section to display a display message based on the received communications control message.

A transmission system includes the aforementioned transmission management system and the aforementioned transmission terminals. Each of the transmission terminals includes a receiving section that receives a communications control message transmitted from the transmission management system, and a communications stop section that causes the transmission terminal to stop performing image communications in accordance with the received communications control message.

According to the aforementioned transmission system, each of the transmission terminals may further include a control section that causes an image capturing section imaging a subject and obtaining image data to be subjected to the image communications to stop the imaging in accordance with the communications control message received by the receiving section.

A transmission system includes the aforementioned transmission management system and the aforementioned transmission terminals. Each of the transmission terminals includes a receiving section that receives a display control message transmitted from the transmission management system, and a display control section that causes a specified display section to delete the specified display message displayed on the specified display section in accordance with the received display control message.

A program causes the transmission management system to function as each of the aforementioned section.

A program supply system supplies the aforementioned program to the transmission management system through a communications network.

A maintenance system performs maintenance of the aforementioned transmission management system.

BRIEF DESCRIPTION OF DRAWINGS

FIG. 7 is a functional block diagram of each terminal, each apparatus, and the system included in the transmission system according to the embodiment;

FIG. 10 is a conceptual view illustrating a quality change management table;

FIG. 11 is a conceptual view illustrating a relaying apparatus management table;

FIG. 12 is a conceptual view illustrating a terminal authentication management table;

FIG. 13 is a conceptual view illustrating a terminal management table;

FIG. 14 is a conceptual view illustrating a destination list management table;

FIG. 15 is a conceptual view illustrating a session management table;

FIG. 16 is a conceptual view illustrating an address priority management table;

FIG. 17 is a conceptual view illustrating a transmission speed priority management table;

FIG. 18 is a conceptual view illustrating a quality management table;

FIG. 23 is a schematic illustrating calculated points of priorities when the filtering processing to select the relaying apparatuses is performed;

FIG. 28 is a flowchart illustrating a part of processing to create the communications control message in detail;

FIG. 33 is a sequence diagram illustrating processing in which image data and voice data are transmitted and received between the terminals.

BEST MODE(S) FOR CARRYING OUT THE INVENTION

An embodiment is described below with reference to FIGS. 1 to 33. In the embodiment, a transmission terminal performs voice communications by transmitting voice data to another transmission terminal on the other parties' side and performs image communications by transmitting image data to the transmission terminal on the other parties' side.

<<Overall Structure of Embodiment>>

Figure 1:
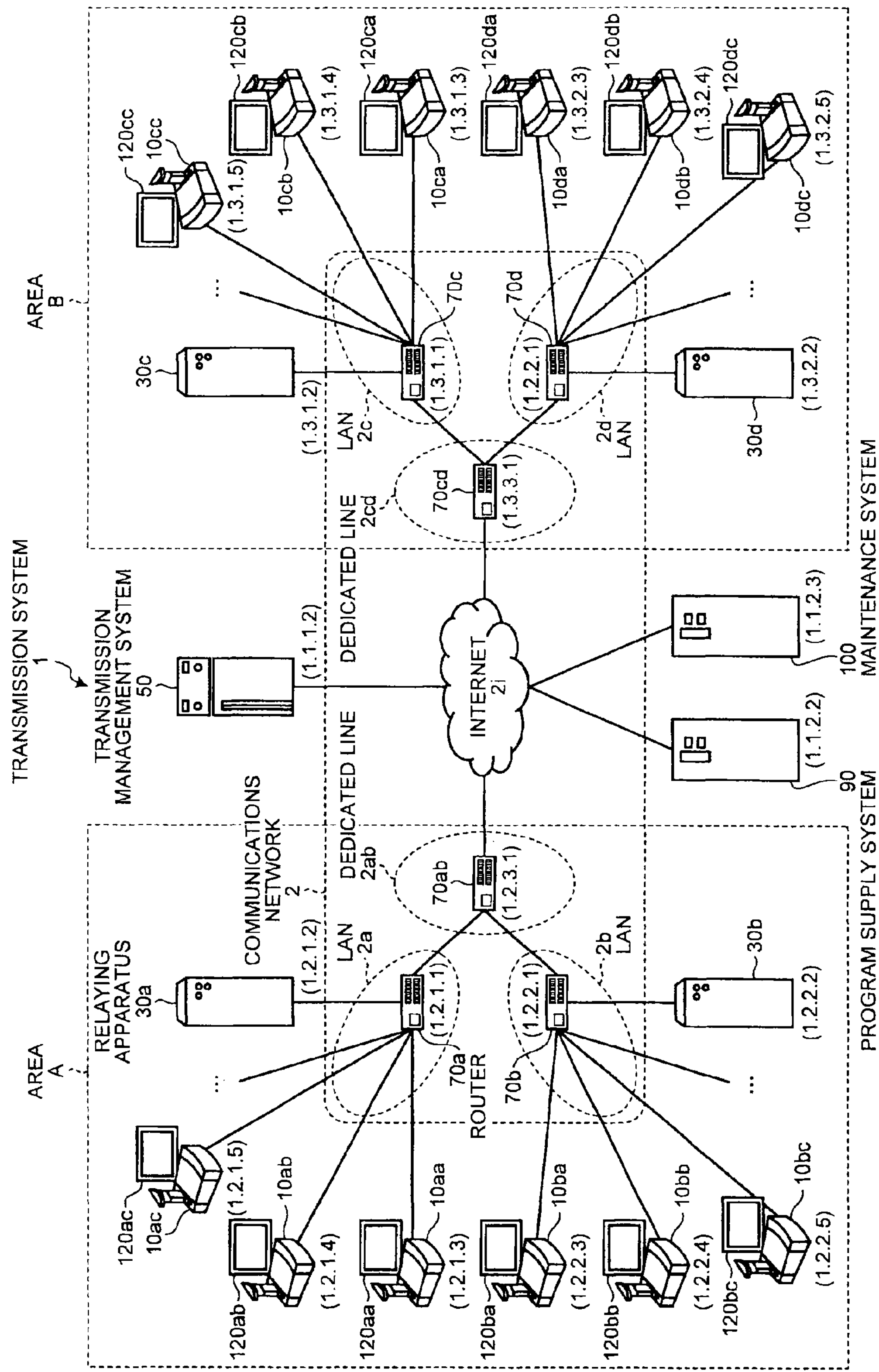
FIG. 1 is a schematic of a transmission system according to a first embodiment.
Figure 2:
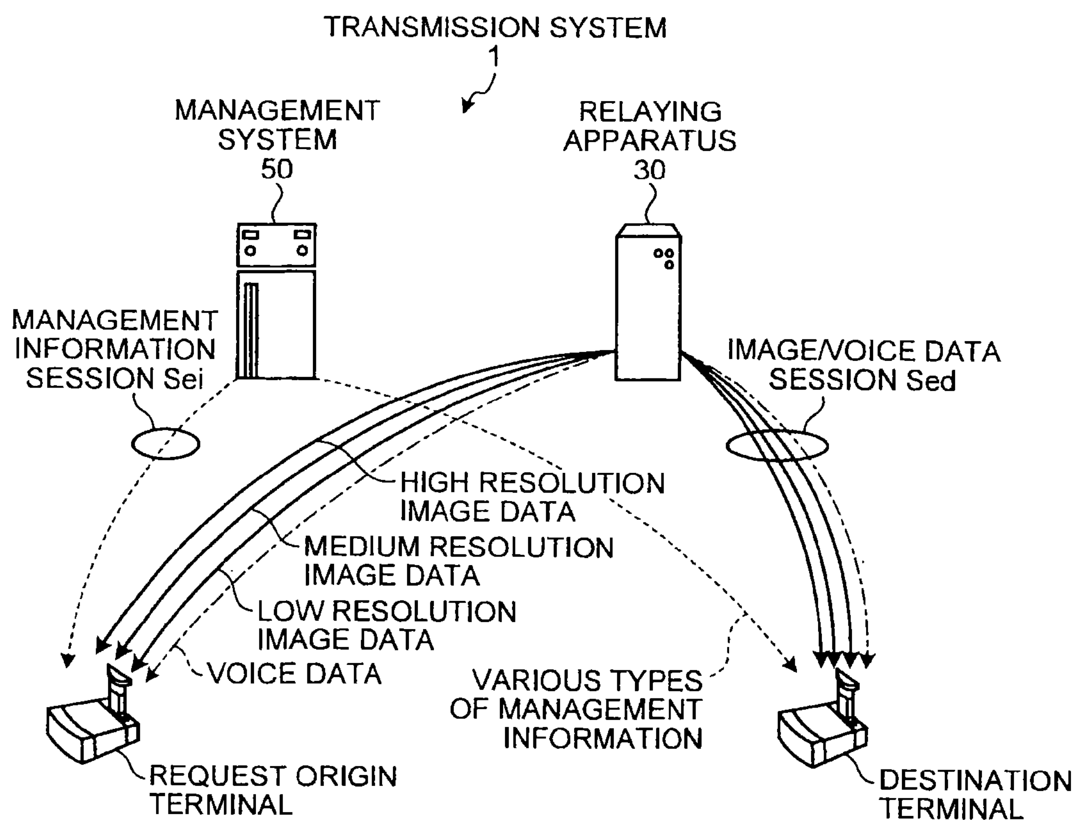
FIG. 2 is a conceptual view illustrating a state of transmitting and receiving of image data, voice data, and various types of management information in the transmission system.
Figure 3A:
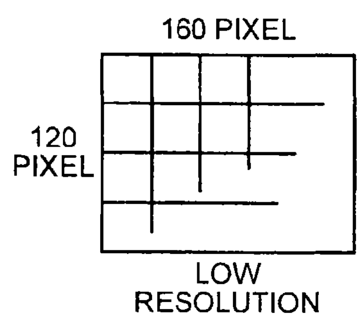
FIGS. 3A to 3C are conceptual views explaining image quality of the image data.
Figure 3B:
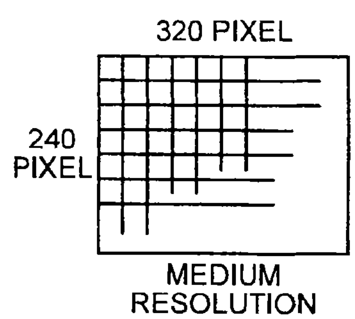
Figure 3C:
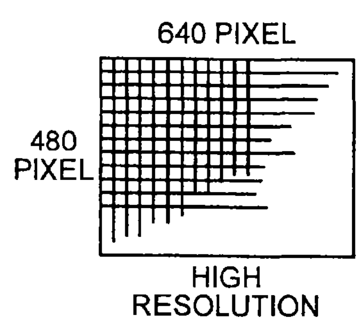

FIG. 1 is a schematic of a transmission system 1 according to the embodiment. FIG. 2 is a conceptual view illustrating a state of transmitting and receiving of image data, voice data, and various types of management information in the transmission system. FIGS. 3A to 3C are conceptual views explaining image quality of the image data.

The transmission system includes a data supply system in which content data is transmitted from a transmission terminal on one side to another transmission terminal on the other side through a transmission management system in one direction and a communication system in which information and feelings, for example, are mutually transmitted among a plurality of transmission terminals through the transmission management system. The communication system is a system for transmitting information and feelings mutually among a plurality of communication terminals (corresponding to the "transmission terminals") through a communication management system (corresponding to the "transmission management system"). Examples of the communication system include a television conference system and a television telephone system.

In the embodiment, the transmission system, the transmission management system, and the transmission terminal are described on the assumption of the television conference system as an example of the communication system, a television conference management system as an example of the communication management system, and a television conference terminal as an example of the communication terminal. That is, the transmission terminal and the transmission management system of the embodiment are applicable to not only the television conference system but also the communication system or a transmission system. The term "television conference", which is described in the embodiment, may be called as a "video conference". Both are used as the same meaning.

The transmission system 1 illustrated in FIG. 1 includes a plurality of transmission terminals (10*aa*, 10*ab*, . . . ), displays (120*aa*, 120*ab*, . . . ) serving as displays for the respective transmission terminals (10*aa*, 10*ab*, . . . ), a plurality of relaying apparatuses (30*a*, 30*b*, 30*c*, and 30*d*), a transmission management system 50, a program supply system 90, and a maintenance system 100.

The transmission terminals 10 perform transmission by transmitting and receiving image data and voice data, which are examples of content data.

Hereinafter, the "transmission terminal" is simply expressed as the "terminal" while the "transmission management system" is simply expressed as the "management system". An arbitrary terminal among the terminals (10*aa*, 10*ab*, . . . ) is expressed as a "terminal 10". An arbitrary display among the displays (120*aa*, 120*ab*, . . . ) is expressed as a "display 120". An arbitrary relaying apparatus among the relaying apparatuses (30*a*, 30*b*, 30*c*, and 30*d*) is expressed as a "relaying apparatus 30". A terminal that requests a start of a television conference as a request origin is expressed as a "request origin terminal" and another terminal that is a destination of the request (relay destination) is described as a "destination terminal".

As illustrated in FIG. 2, in the transmission system 1, a management information session "sei" for transmitting and receiving various types of management information is established between the request origin terminal and the destination terminal through the management system 50. In addition, between the request origin terminal and the destination terminal, four sessions are established for transmitting and receiving four pieces of high resolution image data, medium resolution image data, low resolution image data, and voice data through the relaying apparatus 30. In the embodiment, the four sessions are collectively described as an image/voice data session sed.

A resolution of an image represented by the image data in the embodiment is described below. The image includes a low resolution image that is composed of 160 pixels horizontally and 120 pixels vertically as illustrated in FIG. 3A and serves as a base image, a medium resolution image composed of 320 pixels horizontally and 240 pixels vertically as illustrated in FIG. 3B, and a high resolution image composed of 640 pixels horizontally and 480 pixels vertically as illustrated in FIG. 3C. Among them, when the image data is transmitted through a narrow bandwidth path, low image quality image data composed of only low resolution image data serving as the base image is relayed. When the bandwidth is relatively wide, medium image quality image data composed of the low resolution image data serving as the base image and image data including medium resolution image data is relayed. When the bandwidth is very wide, high image quality image data including the low resolution image data serving as the base image, the medium resolution image data, and high resolution image data is relayed.

The relaying apparatus 30 illustrated in FIG. 1 relays content data among the terminals 10. The management system 50 manages integrally or collectively a login authentication from the terminal 10, a management of a telephone conversation state of the terminal 10, a management of destination list and the like, as well as a communication state of the relaying apparatus 30. Images represented by the image data may be moving images or still images, or both moving and still images.

A plurality of routers (70*a*, 70*b*, 70*c*, 70*d*, 70*ab*, and 70*cd*) select optimal routes for image data and voice data. Hereinafter, an arbitrary router among the routers (70*a*, 70*b*, 70*c*, 70*d*, 70*ab*, and 70*cd*) is expressed as a "router 70".

The program supply system 90 includes an HD (Hard Disk) 204, which is described later. A terminal program enabling the terminal 10 to realize various functions (or to function as various sections) is stored in the HD 204. The program supply system 90 can transmit the terminal program to the terminal 10. In addition, the program supply system 90 stores a relaying apparatus program enabling the relaying apparatus 30 to realize various functions (or to function as various sections) in the HD 204 and can transmit the relaying apparatus program to the relaying apparatus 30. Furthermore, the program supply system 90 stores a transmission management program enabling the management system 50 to realize various functions (or to function as various sections) in the HD 204 and can transmit the transmission management program to the management system 50.

The maintenance system 100 is a computer that performs maintenance management or maintenance of at least one of the terminal 10, the relaying apparatus 30, the management system 50 and the program supply system 90. For example, when the maintenance system 100 is installed domestically while the terminal 10, the relaying apparatus 30, the management system 50 or the program supply system 90 is installed overseas, the maintenance system 100 remotely performs the maintenance management or the maintenance of at least one of the terminal 10, the relaying apparatus 30, the management system 50 and the program supply system 90 through a communications network 2. The maintenance system 100 also performs the maintenance, such as the management of a model number, a product serial number, a sale destination, maintenance and inspection, or a failure history, of at least one of the terminal 10, the relaying apparatus 30, the management system 50 and the program supply system 90 without using the communications network 2.

The terminals (10*aa*, 10*ab*, 10*ac*, . . . ), the relaying apparatus 30*a*, and the router 70*a* are coupled to each other with a LAN 2*a* so as to enable communications among them. The terminals (10*ba*, 10*bb*, 10*bc*, . . . ), the relaying apparatus 30*b*, and the router 70*b* are coupled to each other with a LAN 2*b* so as to enable communications among them. The LANs 2*a* and 2*b* are coupled to each other with a dedicated line 2*ab* including the router 70*ab* so as to enable communications among them, and structured in a predetermined area A. For example, the area A is Japan and the LAN 2*a* is structured in a business office in Tokyo while the LAN 2*b* is structured in a business office in Osaka.

The terminals (10*ca*, 10*cb*, 10*cc*, . . . ), the relaying apparatus 30*c*, and the router 70*c* are coupled to each other with a LAN 2*c* so as to enable communications among them. The terminals (10*da*, 10*db*, 10*dc*, . . . ), the relaying apparatus 30*d*, and the router 70*d* are coupled to each other with a LAN 2*d* so as to enable communications among them. The LANs 2*c* and 2*d* are coupled to each other with a dedicated line 2*cd* including the router 70*cd* so as to enable communications among them, and structured in a predetermined area B. For example, the area B is the United States of America and the LAN 2*c* is structured in a business office in New York while the LAN 2*d* is structured in a business office in Washington, D.C. The areas A and B are coupled to each other with the routers (70*ab*, 70*cd*) through Internet 2*i* so as to enable communications therebetween.

The management system 50 and the program supply system 90 are coupled to each terminal 10 and each relaying apparatus 30 via the Internet 2*i* so as to enable the systems to perform communications with each terminal 10 and each relaying apparatus 30. The management system 50 and the program supply system 90 may be disposed in the area A or the area B, or in any area other than the areas A and B.

In the embodiment, the communications network 2 of the embodiment is structured with the LANs 2*a* and 2*b*, the dedicated lines 2*ab* and 2*cd*, the Internet 2*i*, and the LANs 2*c* and 2*d*. The communications network 2 may include a section in which communications is performed wirelessly such as Wi-Fi (Wireless Fidelity) or Bluetooth (registered trademark) besides the wired transmission.

In FIG. 1, four numbers indicated under each terminal 10, each relaying apparatus 30, the management system 50, each router 70, and the program supply system 90 simply represent commonly used IP addresses in IPv4. For example, the IP address of the terminal 10*aa* is "1.2.1.3". The IPv6 may be also used instead of IPv4. However, the explanation is made by using IPv4 for simple explanation.

Each terminal 10 may be used in a telephone conversation made in the same room, or in a telephone conversation made between an outdoor site and an indoor site or among the outdoor sites in addition to a telephone conversation made among a plurality of business offices and a telephone conversation made among different rooms in the same business office. When each terminal 10 is used at an outdoor site, communications is performed wirelessly such as a cellular phone communications network.

<<Hardware Structure of Embodiment>>

Figure 4:
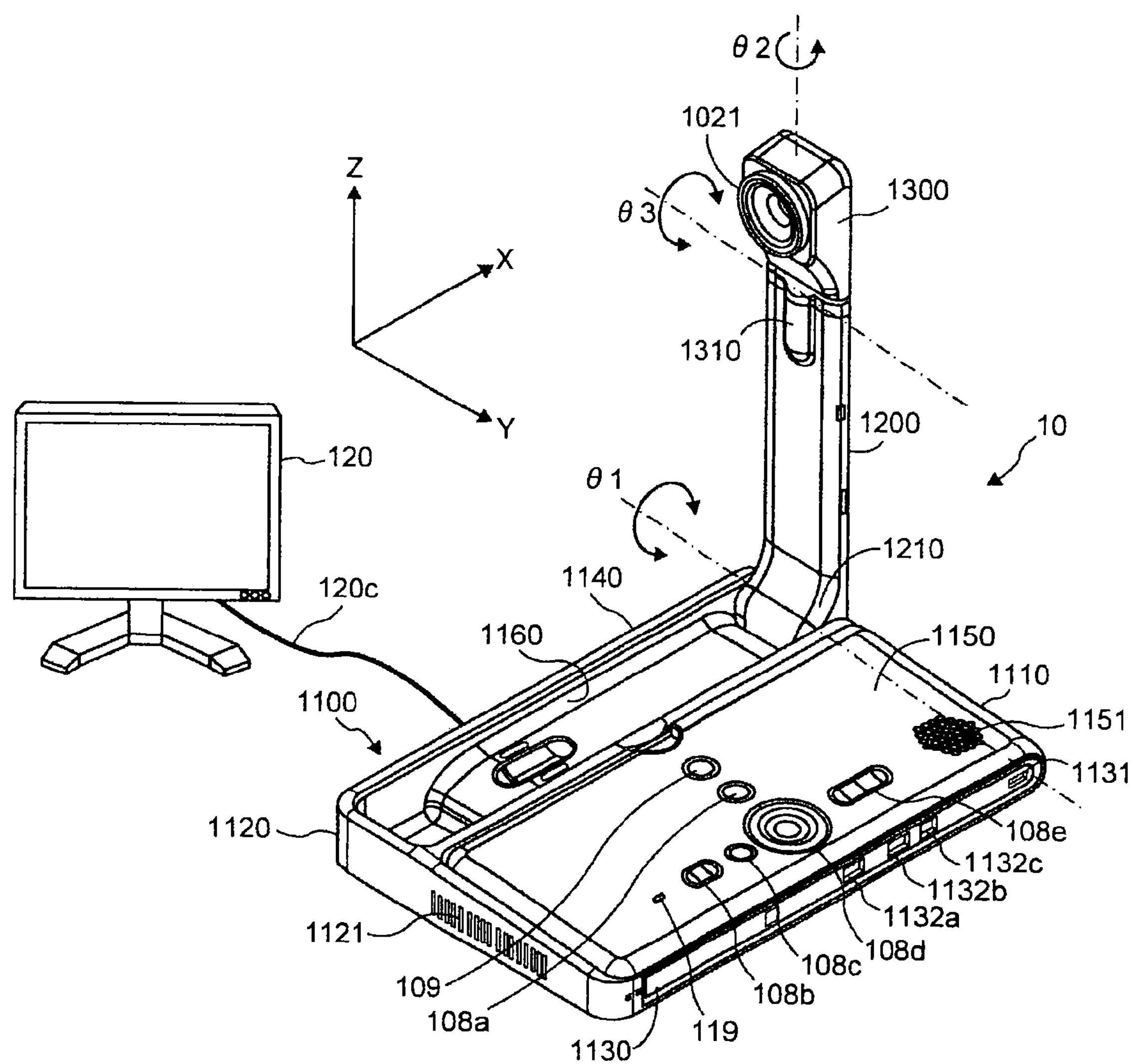
FIG. 4 is an external view of a terminal according to the embodiment.

A hardware structure of the embodiment is described below. FIG. 4 is an external view of the terminal 10 according to the embodiment. In the following description, a longitudinal direction of the terminal 10 is defined as an X-axis direction, a direction orthogonal to the X-axis direction in a horizontal plane is defined as a Y-axis direction, and a direction perpendicular to the X-axis and Y-axis directions (vertical direction) is defined as a Z-axis direction.

As illustrated in FIG. 4, the terminal 10 includes a housing 1100, an arm 1200, and a camera housing 1300. A front sidewall surface 1110 of the housing 1100 includes an air intake surface (not illustrated) having a plurality of air intake holes. A rear sidewall surface 1120 of the housing 1100 includes an air exhaust surface 1121 having a plurality of air exhaust holes. As a result, external air at the front of the terminal 10 can be taken in through the air intake surface (not illustrated) and the taken air can be exhausted toward the rear of the terminal 10 through the air exhaust surface 1121. A right sidewall surface 1130 of the housing 1100 has a sound-collecting hole 1131. The sound-collecting hole 1131 enables a built-in microphone 114, which is described later, to collect sounds such as voices, other sounds, and noises.

An operation panel 1150 is formed on a side adjacent to the right sidewall surface 1130 of the housing 1100. The operation panel 1150 is provided with a plurality of operation buttons (108*a* to 108*e*), a power source switch 109, and an alarm lamp 119, which are described later, and includes a sound output surface 1151 having a plurality of voice output holes through which output sound from a built-in speaker 115, which is described later, passes. In addition, a housing section 1160 is formed in a recess so as to house the arm 1200 and the camera housing 1300, on a side adjacent to a left sidewall surface 1140 of the housing 1100. The right sidewall surface 1130 of the housing 1100 is provided with a connecting ports (1132*a* to 1132*c*) for electrically connecting cables to an external device connection I/F 118, which is described later. On the other hand, the left sidewall surface 1140 of the housing 1100 is provided with a connecting port (not illustrated) for electrically connecting a cable 120*c* for a display 120 to the external device connection I/F 118, which is described later.

In the following description, an arbitrary operation button among the operation buttons (108*a* to 108*e*) is expressed as an "operation button 108" while an arbitrary connecting port among the connecting ports (1132*a* to 1132*c*) is expressed as a "connecting port 1132".

The arm 1200 is mounted on the housing 1100 with a torque hinge 1210 such that the arm 1200 is rotatable with respect to the housing 1100 in the up-down direction within a range of a tilt angle θ1 of 135 degrees. FIG. 4 illustrates the state when the tilt angle θ1 is 90 degrees.

The camera housing 1300 includes a built-in camera 112, which is described later. The camera 112 can be used to image a user, a document, and a room, for example. The camera housing 1300 has a torque hinge 1310. The camera housing 1300 is mounted on the arm 1200 with the torque hinge 1310. The camera housing 1300 is mounted on the arm 1200 with the torque hinge 1310 such that the camera housing 1300 is rotatable with respect to the arm 1200 in the up-down and left-right directions within a range of a pan angle θ2 of ±180 degrees when the angle is 0 degrees in the state illustrated in FIG. 4 and within a range of a tilt angle θ3 of ±45 degrees.

The relaying apparatus 30, the management system 50, and the program supply system 90 have the same outer appearances as those of typical servers and computers. The description of their outer appearances is thus omitted.

Figure 5:
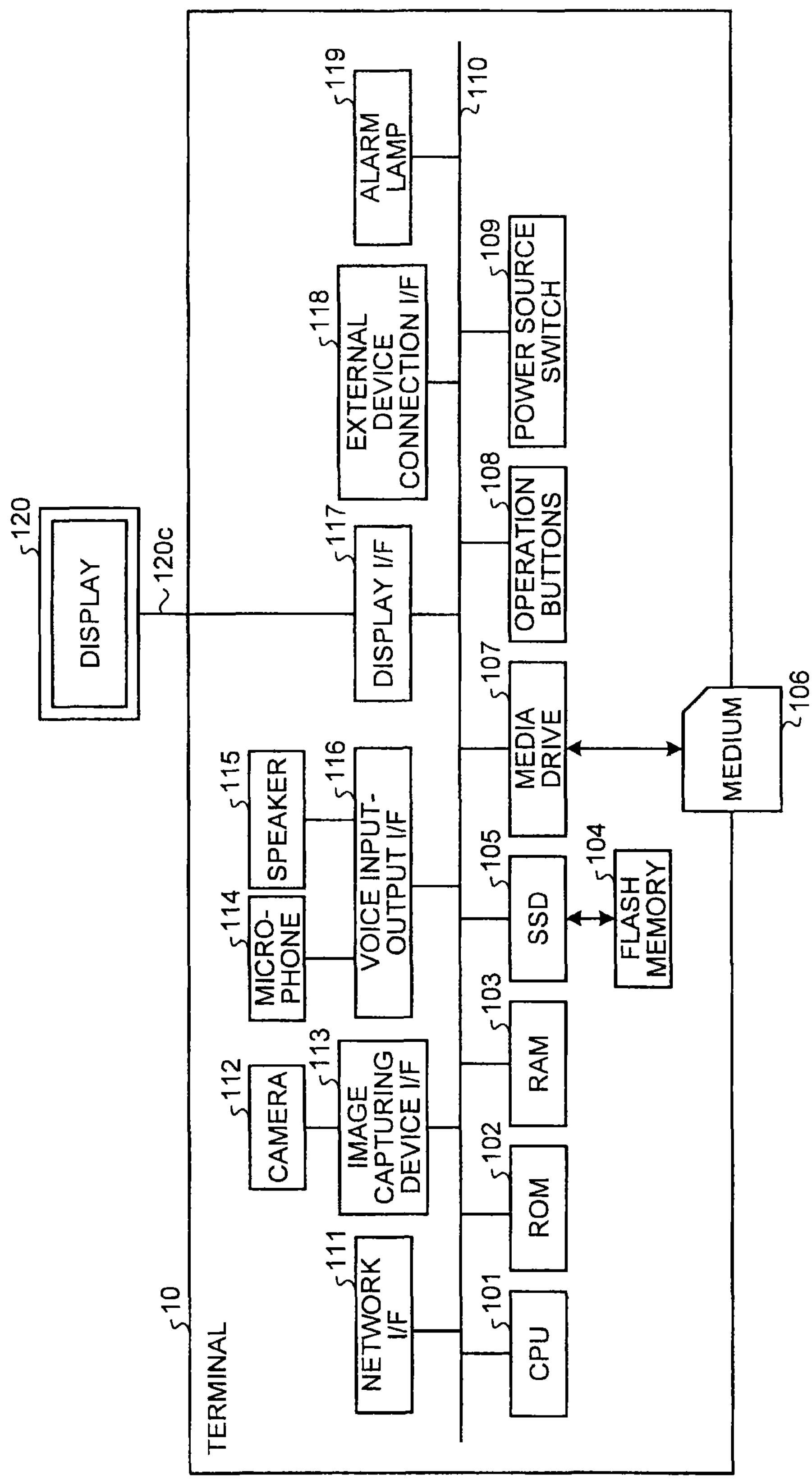
FIG. 5 is a schematic illustrating a hardware structure of the terminal according to the embodiment.

FIG. 5 is a schematic illustrating a hardware structure of the terminal 10 according to the embodiment. As illustrated in FIG. 5, the terminal 10 of the embodiment includes a CPU (Central Processing Unit) 101 that controls overall operation of the terminal 10, a ROM (Read Only Memory) 102 that stores therein a program used to drive the CPU 101 such as an IPL (Initial Program Loader), a RAM (Random Access Memory) 103 used as a working area of the CPU 101, a flash memory 104 that stores therein various types of data such as the terminal program, the image data, and the voice data, and an SSD (Solid State Drive) 105 that controls reading of various types of data from or writing various types of data into the flash memory 104 under the control of the CPU 101, a media drive 107 that controls reading of data from or writing (storing) of data into a recording medium 106 such as a flash memory, the operation buttons 108 operated when a destination of the terminal 10 is selected, for example, the power source switch 109 that switches ON and OFF of the power source of the terminal 10, and a network I/F (Interface) 111 that performs data transmission by utilizing the communications network 2.

The terminal 10 further includes the built-in camera 112 that images a subject and acquires the image data under the control of the CPU 101, an image capturing device I/F 113 that controls driving of the camera 112, the built-in microphone 114 that receives voices, the built-in speaker 115 that outputs voices, a voice input-output I/F 116 that processes input and output of a voice signal between the microphone 114 and the speaker 115 under the control of the CPU 101, a display I/F 117 that transmits image data to the display 120 externally mounted under the control of the CPU 101, the external device connection I/F 118 that connects various external devices, the alarm lamp 119 that alarms the abnormalities of the various functions of the terminal 10, and a bus line 110 that electrically connects the above-described components as illustrated in FIG. 5, such as an address bus or a data bus. Some terminals 10 do not include the cameras 112 and the image capturing device I/Fs 113 depending on the models.

The display 120 includes a liquid crystal or organic EL by which images of subjects and operation icons, for example, are displayed. The display 120 is coupled to the display I/F 117 with the cable 120*c*. The cable 120*c* may be an analog RGB (VGA) signal cable, a component video cable, an HDMI (High-Definition Multimedia Interface) signal cable, or a DVI (Digital Video Interactive) signal cable.

The camera 112 includes a lens and a solid state image capturing device that converts light into charges so as to generate an electrically available image (picture) of a subject. As the solid state image capturing device, a CMOS (Complementary Metal Oxide Semiconductor) or a CCD (Charge Coupled Device) is used, for example.

The external device connection I/F 118 can be coupled with external devices such as an external camera, an external microphone, and an external speaker via USB (Universal Serial Bus) cables, for example. When an external camera is coupled, the external camera is driven prior to the built-in camera 112 under the control of the CPU 101. Likewise, when an external microphone and an external speaker are coupled, the external microphone and the external speaker are driven prior to the built-in microphone 114 and the built-in speaker 115 under the control of the CPU 101.

The recording medium 106 is attachable to and detachable from the terminal 10. An EEPROM (Electrically Erasable and Programmable ROM) may be used, for example, as a non-volatile memory from which data is read or into which data is written under the control of the CPU 101. The non-volatile memory is not limited to the flash memory 104.

The terminal program may be recorded into a computer readable recording medium such as the recording medium 106 in an installable format or an executable format and distributed. The terminal program may be stored in the ROM 102 instead of the flash memory 104.

Figure 6:
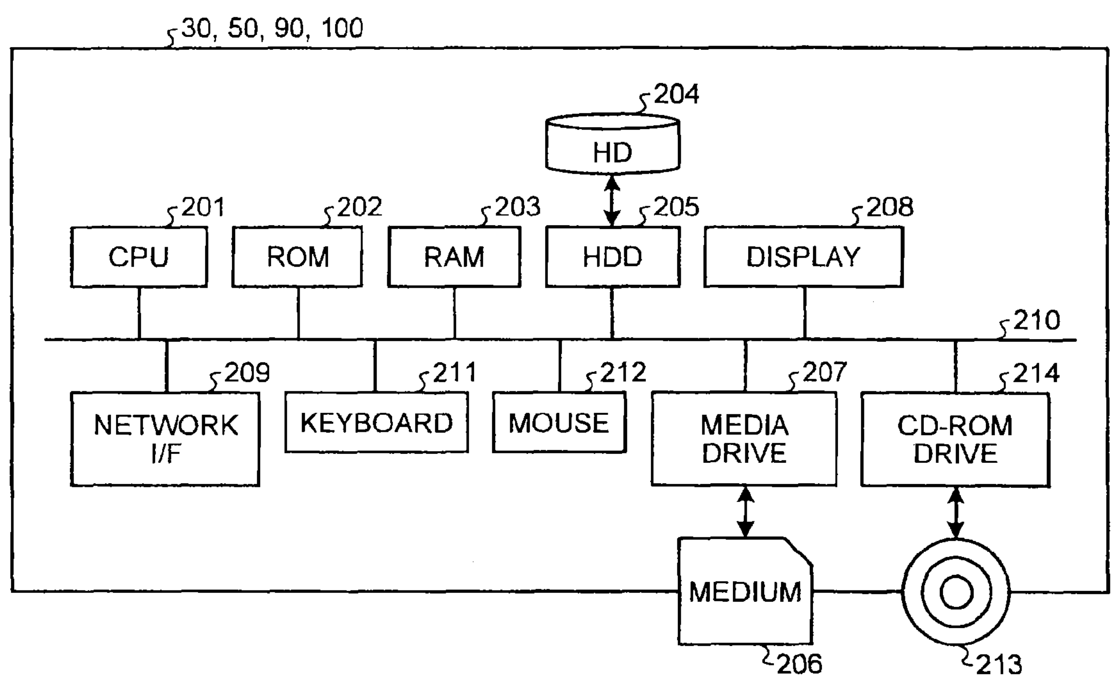
FIG. 6 is a schematic illustrating a hardware structure of a management system, a relaying apparatus, or a program supply system according to the embodiment.

FIG. 6 is a schematic illustrating a hardware structure of the management system according to the embodiment. The management system 50 includes a CPU 201 that controls the overall operation of the management system 50, a ROM 202 that stores therein a program used to drive the CPU 201 such as an IPL, a RAM 203 used as a working area of the CPU 201, the HD 204 that stores therein various types of data such as the transmission management program, an HDD (Hard Disk Drive) 205 that controls reading of various types of data from or writing of various types of data into the HD 204 under the control of the CPU 201, a media drive 207 that controls reading data from or writing (storing) data into a recording medium 206 such as a flash memory, a display 208 that displays various types of information such as a cursor, menus, windows, characters, and images, a network I/F 209 that performs data transfer by utilizing the communications network 2, a keyboard 211 that is provided with a plurality of keys to input characters, numerical values, and various instructions, a mouse 212 that is used to select and execute various instructions, select items to be processed, and move the cursor, a CD-ROM drive 214 that controls reading of various types of data from or writing of various types of data into a CD-ROM (Compact Disc Read Only Memory) 213 as an example of an attachable-detachable recording medium, and a bus line 210 that electrically connects the above-described elements as illustrated in FIG. 6, such as an address bus or a data bus.

The transmission management program may be recorded into a computer readable recording medium such as the recording medium 206 or the CD-ROM 213 in an installable format or an executable format and distributed. The transmission management program may be stored in the ROM 202 instead of the HD 204.

The relaying apparatus 30 has the same hardware structure as that of the management system 50. The description thereof is thus omitted. However, the HD 204 records the relaying apparatus program that controls the relaying apparatus 30. Also in this case, the relaying apparatus program may be recorded into a computer readable recording medium such as the recording medium 206 or the CD-ROM 213 in an installable format or an executable format and distributed. The relaying apparatus program may be stored in the ROM 202 instead of the HD 204.

The program supply system 90 and the maintenance system 100 have the same hardware structure as that of the management system 50. The description thereof is thus omitted. The HD 204 records a program supply program that controls the program supply system 90. Also in this case, the program supply program may be recorded into a computer readable recording medium such as the recording medium 206 or the CD-ROM 213 in an installable format or an executable format and distributed. The program supply system program may be stored in the ROM 202 instead of the HD 204.

The programs may be recorded into a computer readable recording medium such as a CD-R (computer Disc recordable), a DVD (digital Versatile Disk), or a Blue-ray disc as another example of the above-described attachable-detachable recording medium, and supplied.

<<Functional Structure of Embodiment>>

A functional structure of the embodiment is described below. In the embodiment, a case is described in which a delay occurs in receiving of image data performed by the terminal 10 serving as a destination (relay destination), the resolution of an image represented by image data is changed by the relaying apparatus 30, and thereafter the resulting image data is transmitted to the terminal 10 serving as the relay destination.

FIG. 7 is a functional block diagram of each terminal, each apparatus, and the system included in the transmission system 1 of the embodiment. In FIG. 7, the terminal 10, the relaying apparatus 30, and the management system 50 are coupled so as to enable data communications among them through the communications network 2. The program supply system 90 illustrated in FIG. 1 is omitted in FIG. 7 because the program supply system 90 does not directly relate to communications in a television conference.

<Functional Structure of Terminal>

The terminal 10 includes a transmitting-receiving section 11, an operation input reception section 12, a login request section 13, an image capturing section 14, a voice input section 15*a*, a voice output section 15*b*, a final filtering section 16, a display control section 17, a delay detection section 18, a storage-read processing section 19, and a message creation section 20. Each of the sections is a function that is achieved when any of the components illustrated in FIG. 5 are operated by commands from the CPU 101 in accordance with the terminal program loaded on the RAM 103 from the flash memory 104, or means for performing the function. The terminal 10 includes a storage section 1000 structured by the RAM 103 and the flash memory 104 that are illustrated in FIG. 5.

(Functional Structures of Terminal)

Each functional structure of the terminal 10 is described in detail with reference to FIGS. 5 and 7. In the following description of each functional structure of the terminal 10, a relationship between each functional structure of the terminal 10 and major components that achieve each functional structure among the components illustrated in FIG. 5 is also described.

The transmitting-receiving section 11 of the terminal 10 illustrated in FIG. 7 is achieved by a command from the CPU 101 illustrated in FIG. 5 and the network I/F 111 illustrated in FIG. 5. The transmitting-receiving section 11 transmits and receives various types of data (or information) between itself and the other terminals, apparatuses, or the system through the communications network 2. The transmitting-receiving section 11 starts receiving pieces of state information indicating the states of the respective terminals serving as destination candidates from the management system 50 before starting a telephone conversation with a desired destination terminal. The state information indicates not only the operation state of each terminal 10 (an online state or an offline state) but also a detailed state such as whether in the online state and a telephone conversation can be made, whether in a busy state, or whether a user is absent. In addition, the state information indicates not only the operation state of the terminal 10 but also various states in the terminal 10. For example, a state in which the cable 120*c* is come off from the terminal 10, a state in which the terminal 10 outputs voices but no images, and a state in which the terminal 10 outputs no voices (MUTE). A case in which the state information indicates the operation state is described below as an example.

The operation input reception section 12, which is achieved by a command from the CPU 101 illustrated in FIG. 5, and the operation buttons 108 and the power source switch 109 illustrated in FIG. 5, receives various types of inputs from a user. For example, once a user turns ON the power source switch 109 illustrated in FIG. 5, the operation input reception section 12 illustrated in FIG. 7 receives the power source ON and causes the power source to be turned ON.

The login request section 13, which is achieved by a command from the CPU 101 illustrated in FIG. 5, once the power source ON is received, automatically transmits login request information indicating a request for a login and a current IP address of the request origin terminal to the management system 50 from the transmitting-receiving section 11 through the communications network 2. When the user switches the power source switch 109 from the ON state to the OFF state, the operation input reception section 12 completely turns OFF the power source after the transmitting-receiving section 11 transmits the state information indicating that the power source is to be turned OFF to the management system 50. As a result, the management system 50 can grasp the fact that the power source of the terminal 10 has been turned OFF from the ON state.

The image capturing section 14, which is achieved by a command from the CPU 101 illustrated in FIG. 5, and the camera 112 and the image capturing device I/F 113 illustrated in FIG. 5, images a subject and outputs the resulting image data. Some terminals 10 do not include the image capturing sections 14 depending on the models.

The voice input section 15*a*, which is achieved by a command from the CPU 101 illustrated in FIG. 5 and the voice input-output I/F 116 illustrated in FIG. 5, inputs voice data relating to a voice signal, after the microphone 114 converts a voice of a user into the voice signal. The voice output section 15*b*, which is achieved by a command from the CPU 101 illustrated in FIG. 5 and the voice input-output I/F 116 illustrated in FIG. 5, outputs a voice signal relating to voice data to a speaker so as to cause the speaker 115 to output a voice.

Figure 8:
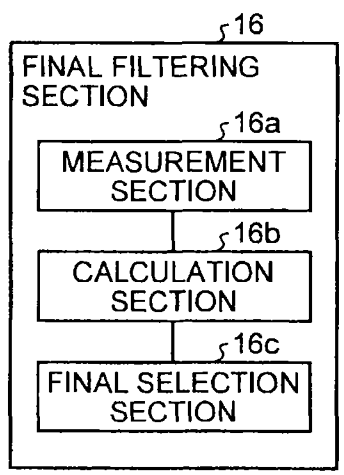
FIG. 8 is a schematic illustrating a functional structure of a final filtering section.

The final filtering section 16 is achieved by a command from the CPU 101 illustrated in FIG. 5 so as to include a measurement section 16*a*, a calculation section 16*b*, and a final selection section 16*c* as illustrated in FIG. 8. The final filtering section 16 performs final filtering processing in which one of the relaying apparatuses 30 is finally selected.

The measurement section 16*a* measures a receiving date at which the transmitting-receiving section 11 receives prior transmission information, which is described later, for each prior transmission information received by the transmitting-receiving section 11. The calculation section 16*b* calculates a necessary period of time (T) from transmitting to receiving the prior transmission information in accordance with a difference between the measured receiving time and a transmission date included in the prior transmission information for each prior transmission information for which the measurement section 16*a* has measured the receiving date. The final selection section 16*c* finally selects one of the relaying apparatuses by selecting the relaying apparatus 30 that has relayed the prior transmission information having the shortest necessary period of time among the necessary periods of time calculated by the calculation section 16*b*.

The display control section 17, which is achieved by a command from the CPU 101 illustrated in FIG. 5 and the display I/F 117 illustrated in FIG. 5, performs control so as to combine received pieces of image data having different resolutions and transmit the combined image data to the display 120, which is described later. The display control section 17 can transmit information indicating a destination list received from the management system 50 to the display 120 so as to cause the display 120 to display the destination list. In addition, the display control section 17 causes the display 120 to display the screens illustrated in FIGS. 29 to 32. The screens illustrated in FIGS. 29 to 32 are described later.

The delay detection section 18, which is achieved by a command from the CPU 101 illustrated in FIG. 5, detects delay time (ms) of image data or voice data transmitted from the other terminals 10 through the relaying apparatus 30.

The storage-read processing section 19, which is executed by a command from the CPU 101 illustrated in FIG. 5 and the SSD 105 illustrated in FIG. 5 or achieved by a command from the CPU 101, stores various types of data in the storage section 1000 or reads various types of data stored in the storage section 1000. The storage section 1000 stores therein a terminal ID (Identification) and a password for identifying the terminal 10, for example.

The message creation section 20, which is achieved by a command from the CPU 101 illustrated in FIG. 5, reads preliminarily stored image communications state information from the storage section 1000 and creates an image communications state message (m) including the image communications state information. The image communications state information and the image communications state message (m) are described later.

The storage section 1000 stores therein the image communications state information, which is described later. In the storage section 1000, image data and voice data that are received when a telephone conversation is made with the destination terminal are stored and overwritten with new image data and voice data at every receiving of the data. In this regard, an image is displayed on the display 120 in accordance with the image data before being overwritten while a voice is output from the speaker 115 in accordance with the voice data before being overwritten.

The terminal ID and a relaying apparatus ID, which is described later, of the embodiment indicate identification information used for uniquely identifying the terminal 10 and the relaying apparatus 30. For example, the identification information is languages, characters, symbols, or various signs. The terminal ID and the relaying apparatus ID may be the identification information obtained by combining at least two of the languages, characters, symbols, and various signs.

<Functional Structure of Relaying Apparatus>

The relaying apparatus 30 includes a transmitting-receiving section 31, a state detection section 32, a data quality confirmation section 33, a quality change management section 34, a data quality change section 35, and a storage-read processing section 39. Each of the sections is a function that is achieved when any of the components illustrated in FIG. 6 are operated by commands from the CPU 201 in accordance with the relaying apparatus program loaded on the RAM 203 from the HD 204, or means for performing the function. The relaying apparatus 30 includes a storage section 3000 structured by the RAM 203 illustrated in FIG. 6 and/or the HD 204 illustrated in FIG. 6. FIG. 10 is a conceptual view illustrating a quality change management table.

(Quality Change Management Table)

In the storage section 3000, a quality change management DB (Date Base) 3001 having a quality change management table illustrated in FIG. 10 is structured. In the quality change management table, the IP address of the terminal 10 serving as the relay destination (destination) of image data and image quality of the image data to be relayed by the relaying apparatus 30 to the relay destination are managed in association with each other.

(Functional Structures of Relaying Apparatus)

Next, each functional structure of the relaying apparatus 30 is described in detail. In the following description of each functional structure of the relaying apparatus 30, a relationship between each functional structure of the relaying apparatus 30 and major components that achieve each functional structure of the relaying apparatus 30 among the components illustrated in FIG. 6 is also described.

The transmitting-receiving section 31 of the relaying apparatus 30 illustrated in FIG. 7 is achieved by a command from the CPU 201 illustrated in FIG. 6 and the network I/F 209 illustrated in FIG. 6. The transmitting-receiving section 31 transmits and receives various types of data (or information) between itself and the other terminals, apparatuses, or the system through the communications network 2.

The state detection section 32, which is achieved by a command from the CPU 201 illustrated in FIG. 6, detects the operation state of the relaying apparatus 30 including the state detection section 32. The operation state is the "online" state, the "offline" state, the "busy" state, or a "temporary halted" state.

The data quality confirmation section 33, which is achieved by a command from the CPU 201 illustrated in FIG. 6, searches the quality change management DB 3001 (refer to FIG. 10) by using the IP address of the destination terminal as a searching key, and extracts image quality of the image data to be relayed corresponding to the IP address, thereby confirming the image quality of the image data to be relayed.

The quality change management section 34, which is achieved by a command from the CPU 201 illustrated in FIG. 6, changes the content of the quality change management DB 3001 in accordance with quality information, which is described later, transmitted from the management system 50. For example, during a television conference held between the request origin terminal (terminal 10*aa*) having the terminal ID of "01aa" and the destination terminal (terminal 10*db*) having the terminal ID of "01db" by transmitting and receiving high image quality image data, when a delay occurs in receiving the image data in the destination terminal (terminal 10*db*) due to a start of another television conference held between the request origin terminal (terminal 10*bb*) and the destination terminal (terminal 10*ca*) through the communications network 2, for example, the relaying apparatus 30 lowers the image quality of the image data, which has been relayed by the relaying apparatus 30, from high image quality to medium image quality. In such a case, the content of the quality change management DB 3001 is changed in accordance with the quality information indicating the medium quality so as to lower the image quality of the image data relayed by the relaying apparatus 30 from high quality to medium quality.

The data quality change section 35, which is achieved by a command from the CPU 201 illustrated in FIG. 6, changes the image quality of the image data transmitted from the transmission origin terminal in accordance with the changed content of the quality change management DB 3001.

The storage-read processing section 39, which is achieved by a command from the CPU 201 illustrated in FIG. 6 and the HDD 205 illustrated in FIG. 6, stores various types of data in the storage section 3000 or reads various types of data stored in the storage section 3000.

<Functional Structure of Management System>

The management system 50 includes a transmitting-receiving section 51, a terminal authentication section 52, a state management section 53, a terminal extraction section 54, a terminal state extraction section 55, a primary filtering section 56, a session management section 57, a quality determination section 58, a storage-read processing section 59, a delay time management section 60, and a message creation section 61. Each of the sections is a function that is achieved when any of the components illustrated in FIG. 6 are operated by commands from the CPU 201 in accordance with the management system program loaded on the RAM 203 from the HD 204, or means for performing the function. The management system 50 includes a storage section 5000 structured by the HD 204 illustrated in FIG. 6.

Figure 9:
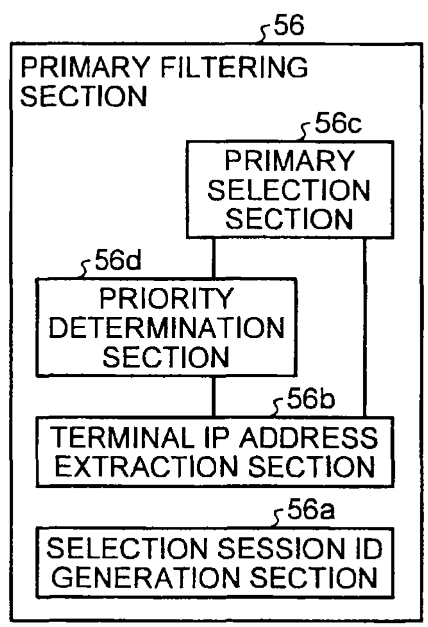
FIG. 9 is a schematic illustrating a functional structure of a primary filtering section.

FIG. 8 is a schematic illustrating a functional structure of the final filtering section. FIG. 9 is a schematic illustrating a functional structure of the primary filtering section. FIG. 11 is a conceptual view illustrating a relaying apparatus management table. FIG. 12 is a conceptual view illustrating a terminal authentication management table. FIG. 13 is a conceptual view illustrating a terminal management table. FIG. 14 is a conceptual view illustrating a destination list management table. FIG. 15 is a conceptual view illustrating a session management table. FIG. 16 is a conceptual view illustrating an address priority management table. FIG. 17 is a conceptual view illustrating a transmission speed priority management table. FIG. 18 is a conceptual view illustrating a quality management table.

(Relaying Apparatus Management Table)

In the storage section 5000, a relaying apparatus management DB 5001 having the relaying apparatus management table illustrated in FIG. 11 is structured. In the relaying apparatus management table, the operation state of the relaying apparatus 30, a receiving date at which the management system 50 received the state information indicating the operation state, the IP address of the relaying apparatus 30, and a maximum data transmission speed (Mbps) of the relaying apparatus 30 are managed in association with each other for each relaying apparatus ID of the relaying apparatuses 30. For example, the relaying apparatus management table illustrated in FIG. 11 indicates that, in relation to the relaying apparatus 30*a* having the relaying apparatus ID of "111a", the operation state is "online", the date at which the management system 50 received the state information is "13:00 on November 10, 2009", the IP address is "1.2.1.2", and the maximum data transmission speed is 100 Mbps.

(Terminal Authentication Management Table)

In addition, in the storage section 5000, a terminal authentication management DB 5002 having the terminal authentication management table illustrated in FIG. 12 is structured. In the terminal authentication management table, the passwords are managed in association with the respective terminal IDs of all of the terminals 10 managed by the management system 50. For example, the terminal authentication management table illustrated in FIG. 12 indicates that the terminal ID of the terminal 10*aa* is "01aa" and the password of the terminal 10*aa* is "aaaa".

(Terminal Management Table)

Furthermore, in the storage section 5000, a terminal management DB 5003 having the terminal management table illustrated in FIG. 13 is structured. In the terminal management table, for each terminal ID of the terminals 10, the destination name of the terminal 10 when designated as the destination, the operation state of the terminal 10, an image communications state, which is described later, of the terminal 10, a receiving date at which the management system 50 received login request information, which is described later, and the IP address of the terminal 10 are managed in association with each other. For example, the terminal management table illustrated in FIG. 13 indicates that, in relation to the terminal 10*aa* having the terminal ID of "01aa", the destination name (terminal name) is "AA terminal, Tokyo business office, Japan", the operation state is "online (a telephone conversation is enabled)", the image communications state is "ON", the date at which management system 50 received the login request information is "13:40 on November 10, 2009", and the IP address is "1.2.1.3".

The image communications state information is described below. The image communications state information indicates the state relating to image communications of the terminal 10 as the following four patterns.

ON: a state in which the terminal 10 is performing image communications.

OFF: a state in which the terminal 10 is halting image communications (the terminal 10, however, includes an image communications function for performing image communications as the image capturing section 14).

NA: a state in which the terminal 10 includes no image communications function (the terminal 10 includes no image communications function for performing image communications, which is performed by the image capturing section 14).

DC: a state in which the image communications state is unclear (no image communications state is transmitted from the terminal 10 because the terminal 10 is offline or in an initial state).

The storage section 1000 stores therein the image communications state information indicating DC as the default. The image capturing section 14 overwrites the image communications state information indicating DC with the image communications state information indicating ON or OFF. The image communications state information indicating NA is stored in the storage section 1000 as the factory default of the terminal 10.

(Destination List Management Table)

Furthermore, in the storage section 5000, a destination list management DB 5004 having the destination list management table illustrated in FIG. 14 is structured. In the destination list management table, the terminal ID of the request origin terminal that requests a start of a telephone conversation in a television conference and all of the terminal IDs of the destination terminals registered as the candidates of the destination terminal are managed in association with each other. For example, the destination list management table illustrated in FIG. 14 indicates that the candidates of the destination terminal (terminal 10*db*) to which the request origin terminal (terminal 10*aa*) having the terminal ID of "01aa" can request a start of a telephone conversation in a television conference are the terminal 10*ab* having the terminal ID of "01ab", the terminal 10*ba* having the terminal ID of "01ba", and the terminal 10*bb* having the terminal ID of "01bb". The candidate of the destination terminal is updated by being added or deleted in response to the request for adding or deleting the candidate made from any request origin terminal to the management system 50.

(Session Management Table)

Furthermore in the storage section 5000, a session management DB 5005 having the session management table illustrated in FIG. 15 is structured. In the session management table, for each selection session ID used for executing a session for selecting the relaying apparatus 30, the relaying apparatus ID of the relaying apparatus 30 used for relaying image data and voice data, the terminal ID of the request origin terminal, the terminal ID of the destination terminal, delay time (ms) in receiving the image data by the destination terminal, and the receiving date at which the management system 50 received the delay information indicating the delay time from the destination terminal are managed in association with each other. For example, the session management table illustrated in FIG. 15 indicates that, in relation to the relaying apparatus 30*a* (the relaying apparatus ID is "111a") selected in a session executed by using a selection session ID "se1", image data and voice data are relayed between the request origin terminal (terminal 10*aa*) having the terminal ID of "01aa" and the destination terminal (terminal 10*db*) having the terminal ID of "01db", and the delay time of the image data is 200 (ms) at the destination terminal (terminal 10*db*) as at "14:00 on November 10, 2009". When a television conference is held between two terminals 10, the receiving date of the delay information may be managed in accordance with the delay information transmitted from the request origin terminal, instead of the destination terminal. However, when a television conference is held among three or more terminals 10, the receiving date of the delay information is managed in accordance with the delay information transmitted from the terminal 10 that receives image data and voice data.

(Address Priority Management Table)

In addition, in the storage section 5000, a priority management DB 5006 having the address priority management table illustrated in FIG. 16 is structured. In the address priority management table, a discrepancy in dot addresses and an address priority are managed in association with each other. The dot address is composed of four section numbers as the commonly used IP address in IPv4. The more the "same" number is included in the dot addresses of the terminal 10 and the relaying apparatus 30 at the corresponding sections in the dot addresses, the higher point the address priority has. The term "same" means that the numbers at the corresponding sections in both dot addresses are equal to each other while the term "difference" means that the numbers at the corresponding sections in both dot addresses are different from each other. For example, in the address priority management table illustrated in FIG. 16, an IP address has the priority "5" (5 points), when three numerical values from the left-most section to the right-most section of a dot address are equal to each other between two IP addresses. Similarly, an IP address has the priority "3" (3 points), when two numerical values from the left-most section to the right-most section of a dot address are equal to each other between two IP address. In this case, the priority is independent of whether the numerical value of the right-most section of a dot address is the same between two IP address. An IP address has the priority "1" (1 point), when the numerical value of the left-most section is the same but the numerical value of the second left-most section of a dot address is not the same between two IP addresses. In this case, the priority is independent of whether the numerical value of the right-most section and the numerical value of the second right-most section of a dot address are the same between two IP address. An IP address has the priority "0" (0 point), when the numerical value of the left-most section of a dot address is different between two IP addresses. In this case, the priority is independent of whether the values from the second left-most section to the right-most section of a dot address are the same between two IP addresses.

(Transmission Speed Priority Management Table)

The priority management DB 5006 structured in the storage section 5000 also includes the transmission speed priority management table illustrated in FIG. 17. In the transmission speed priority management table, the maximum data transmission speed and a transmission speed priority are managed in association with each other such that as the value of the maximum data transmission speed (Mbps) at the relaying apparatus 30 increases, the higher point the transmission speed priority has. For example, in the transmission speed priority management table illustrated in FIG. 17, when the maximum data transmission speed at the relaying apparatus 30 is 1000 Mbps or more, the point of the transmission speed priority is "5". When the maximum data transmission speed at the relaying apparatus 30 is 100 Mbps or more and less than 1000 Mbps, the point of the transmission speed priority is "3". When the maximum data transmission speed at the relaying apparatus 30 is 10 Mbps or more and less than 100 Mbps, the point of the transmission speed priority is "1". When the maximum data transmission speed at the relaying apparatus 30 is less than 10 Mbps, the point of the transmission speed priority is "0".

(Quality Management Table)

In addition, in the storage section 5000, a quality management DB 5007 having the quality management table illustrated in FIG. 18 is structured. In the quality management table, the delay time (ms) of image data and image quality (quality of an image) of image data are managed in association with each other such that as the delay time of image data at the request origin terminal or the destination terminal increases, the image quality of image data relayed by the relaying apparatus 30 is lowered.

(Functional Structures of Management System)

Next, each functional structure of the management system 50 is described in detail. In the following description of each functional structure of the management system 50, a relationship between each functional structure of the management system 50 and major components that achieve each functional structure of the management system 50 among the components illustrated in FIG. 6 is also described.

The transmitting-receiving section 51 is executed by a command from the CPU 201 illustrated in FIG. 6 and the network I/F 209 illustrated in FIG. 6. The transmitting-receiving section 51 transmits and receives various types of data (or information) between itself and the other terminals, apparatuses, or the system through the communications network 2.

The terminal authentication section 52, which is achieved by a command from the CPU 201 illustrated in FIG. 6, searches the terminal authentication management DB 5002 of the storage section 5000 by using the terminal ID and the password that are included in the login request information received through the transmitting-receiving section 51 as searching keys, and performs terminal authentication by determining whether the same terminal ID and password are managed in the terminal authentication management DB 5002.

The state management section 53, which is achieved by a command from the CPU 201 illustrated in FIG. 6, stores the terminal ID of the request origin terminal, the operation state of the request origin terminal, the receiving date at which the management system 50 received the login request information, and the IP address of the request origin terminal in the terminal management DB 5003 (refer to FIG. 13) and manages them in association with each other so as to manage the operation state of the request origin terminal that makes a login request. The state management section 53 changes the operation state in the terminal management DB 5003 (refer to FIG. 13) from online to offline in accordance with the state information that is sent from the terminal 10 and indicates that the power source is to be turned OFF when a user turns OFF the power source switch 109 of the terminal 10 from the ON state.

The terminal extraction section 54, which is achieved by a command from the CPU 201 illustrated in FIG. 6, searches the destination list management DB 5004 (refer to FIG. 14) by using the terminal ID of the request origin terminal that has made a login request as a key, reads the terminal IDs of the candidates of the destination terminal capable of having a telephone conversation with the request origin terminal, and extracts the terminal IDs. In addition, the terminal extraction section 54 searches the destination list management DB 5004 (refer to FIG. 14) by using the terminal ID of the request origin terminal that has made the login request as a key, and extracts the terminal IDs of the other request origin terminals that register the terminal ID of the request origin terminal as the candidate of the destination terminal.

Furthermore, the terminal extraction section 54 searches the destination list management DB 5004 by using the terminal ID of the terminal that has transmitted the image communications state message (m) as the terminal ID of the request origin terminal, and extracts all of the terminal IDs of the destination terminals corresponding to the terminal ID of the terminal that has transmitted the image communications state message (m).

The terminal state extraction section 55, which is achieved by a command from the CPU 201 illustrated in FIG. 6, searches the terminal management DB 5003 (refer to FIG. 13) by using the terminal IDs of the candidates of the destination terminal extracted by the terminal extraction section 54 as searching keys, and reads the operation state of each terminal ID extracted by the terminal extraction section 54. As a result, the terminal state extraction section 55 can acquire the operation states of the candidates of the destination terminal capable of having a telephone conversation with the request origin terminal that has made the login request. Furthermore, the terminal state extraction section 55 searches the terminal management DB 5003 by using the terminal IDs extracted by the terminal extraction section 54 as searching keys, and acquires the operation state of the request origin terminal that has made the login request.

Furthermore the terminal state extraction section 55 searches the terminal management DB 5003 (refer to FIG. 13) by using the terminal ID of the destination terminal as a searching key, and extracts the image communications state information corresponding to that terminal ID. The terminal state extraction section 55 refers to the terminal management DB 5003 (refer to FIG. 13) and extracts the IP address of the terminal 10 that is in the image communications state, the terminal 10 that is halting image communications, or the terminal 10 having the image communications function.

The primary filtering section 56, which is achieved by a command from the CPU 201 illustrated in FIG. 6, performs primary filtering processing prior to the final filtering processing so as to assist the final filtering processing in which one of the relaying apparatuses 30 is finally selected. The primary filtering section 56 is achieved by a command from the CPU 201 illustrated in FIG. 5 so as to include a selection session ID generation section 56*a*, a terminal IP address extraction section 56*b*, a primary selection section 56*c*, and a priority determination section 56*d* as illustrated in FIG. 9.

The selection session ID generation section 56*a* generates the selection session ID used for executing a session for selecting the relaying apparatus 30. The terminal IP address extraction section 56*b* searches the terminal management DB 5003 (refer to FIG. 13) in accordance with the terminal ID of the request origin terminal and the terminal ID of the destination terminal that are included in start request information transmitted from the request origin terminal, and extracts the IP addresses of the respective terminals 10 corresponding to the terminal IDs. The primary selection section 56*c* selects the relaying apparatuses 30 by selecting the relaying apparatus IDs of the relaying apparatuses 30 the operation state of which are "online" among the relaying apparatuses 30 managed by the relaying apparatus management DB 5001 (refer to FIG. 11).

In addition, the primary selection section 56*c* searches the relaying apparatus management DB 5001 (refer to FIG. 11) in accordance with the IP addresses of the request origin terminal and the destination terminal that are extracted by the terminal IP address extraction section 56*b*, and investigates whether the dot address of each IP address of the request origin terminal and the destination terminal is the same as or different from the dot addresses of the IP addresses of the selected relaying apparatuses 30. Thereafter, the primary selection section 56*c* selects two relaying apparatuses 30 having the top two high total points. The total point is obtained as a sum of the higher point in the address priority with respect to the terminals 10 and the point of the transmission speed priority for each relaying apparatus. Although the two relaying apparatuses 30 having the top two high points are selected in the embodiment, the number of relaying apparatuses 30 to be selected is not limited to two. Three or more relaying apparatuses 30 having the top three or more high points may be selected as long as the relaying apparatuses 30 having high points can be selected as many as possible.

The priority determination section 56*d* determines the point of the address priority for each relaying apparatus 30 investigated by the primary selection section 56*c* with reference to the priority management DB 5006 (refer to FIG. 16). In addition, the priority determination section 56*d* searches the priority management DB 5006 (refer to FIG. 17) in accordance with the maximum data transmission speed of each relaying apparatus 30 managed by the relaying apparatus management DB 5001 (refer to FIG. 11), and determines the point of the transmission speed priority of each relaying apparatus 30 selected by the primary filtering processing performed by the primary selection section 56*c*.

The session management section 57, which is achieved by a command from the CPU 201 illustrated in FIG. 6, stores the selection session ID generated by the selection session ID generation section 56*a*, terminal ID of the request origin terminal, and the terminal ID of the destination terminal in the session management DB 5005 of the storage section 5000 (refer to FIG. 15), and manages them in association with each other. In addition, the session management section 57 stores the relaying apparatus ID of the relaying apparatus 30 finally selected by the final selection section 16*c* of the terminal 10 for each selection session ID in the session management DB 5005 (refer to FIG. 15), and manages them.

The quality determination section 58 searches the quality management DB 5007 (refer to FIG. 18) by using the delay time as a searching key, extracts the image quality of the image data corresponding to the delay time, and determines the image quality of the image data to be relayed by the relaying apparatus 30.

The storage-read processing section 59, which is executed by a command from the CPU 201 illustrated in FIG. 6 and the HDD 205 illustrated in FIG. 6, stores various types of data in the storage section 5000 or reads various types of data stored in the storage section 5000.

The delay time management section 60, which is achieved by a command from the CPU 201 illustrated in FIG. 6, searches the terminal management DB 5003 (refer to FIG. 13) by using the IP address of the destination terminal as a searching key, and extracts the terminal ID corresponding to the IP address. In addition, the delay time management section 60 stores the delay time indicated in the delay information in a field of the delay time of a record including the extracted terminal ID in the session management table of the session management DB 5005 (refer to FIG. 15) and manages the stored delay time.

The message creation section 61 creates a communications control message in accordance with the image communications state of each terminal 30. Processing to create the communications control message is described later in detail with reference to FIG. 28. In addition, the message creation section 61 acquires the image communications state information relating to the terminal 10 serving as the transmission origin and the IP address of the terminal 10 from the image communications state message (m) transmitted from the terminal 10. Furthermore, the message creation section 61 rewrites the attribute of the image communications state corresponding to the IP address acquired from the image communications state message (m) in the terminal management DB 5003 (refer to FIG. 13) by overwriting it with the image communications state information acquired from the image communications state message (m).

The message creation section 61 extracts, from the terminal management DB 5003 (refer to FIG. 13), the terminal ID corresponding to the IP address acquired from the image communications state message (m). Furthermore, the message creation section 61 determines whether each of the request origin terminal and all of the destination terminals has the image communications function with reference to the image communications state information extracted from the terminal management DB 5003 (refer to FIG. 13).

<<Processing or Operation of Embodiment>>

Figure 19:
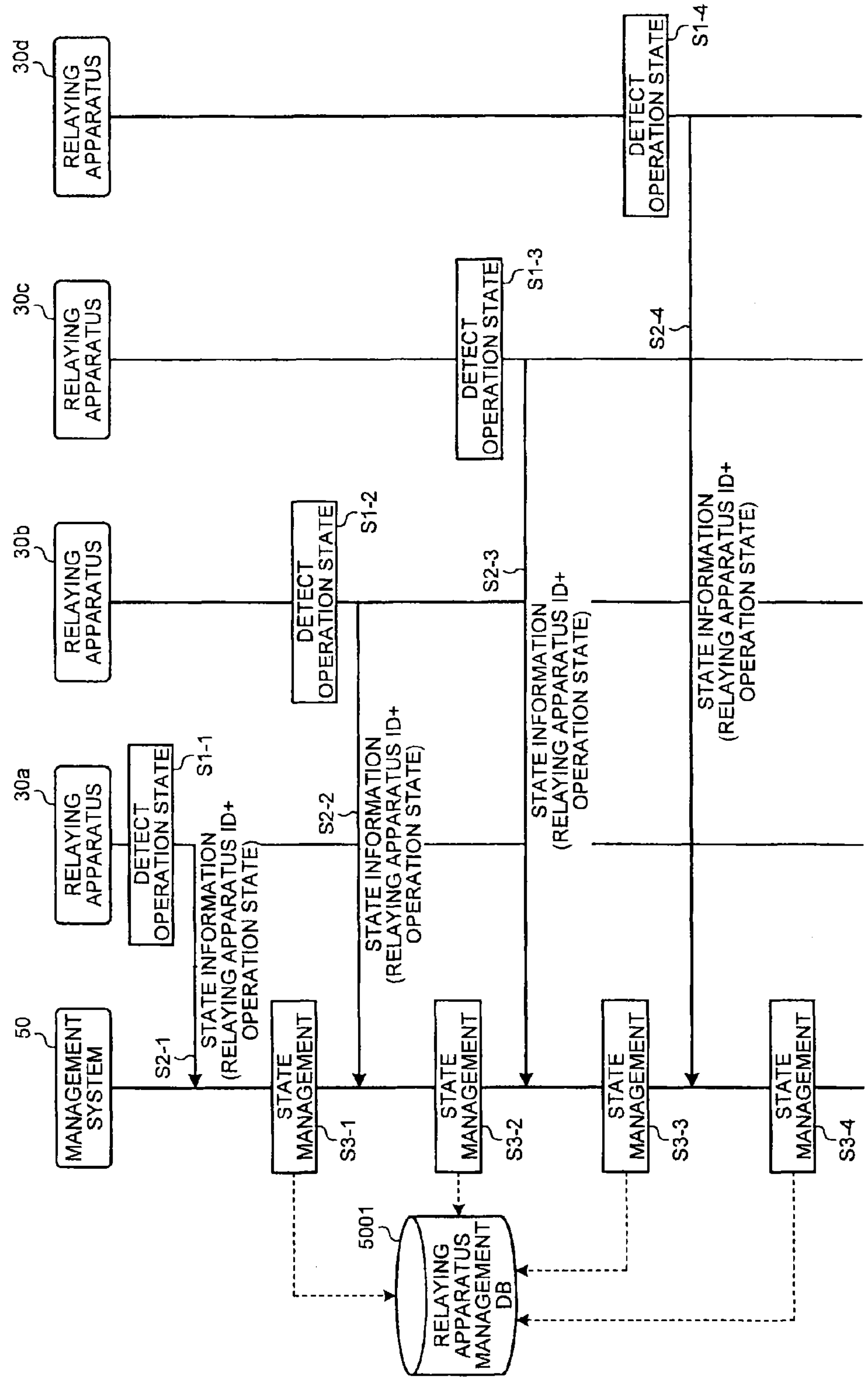
FIG. 19 is a sequence diagram illustrating processing to control state information indicating an operation state of each relaying apparatus.
Figure 20:
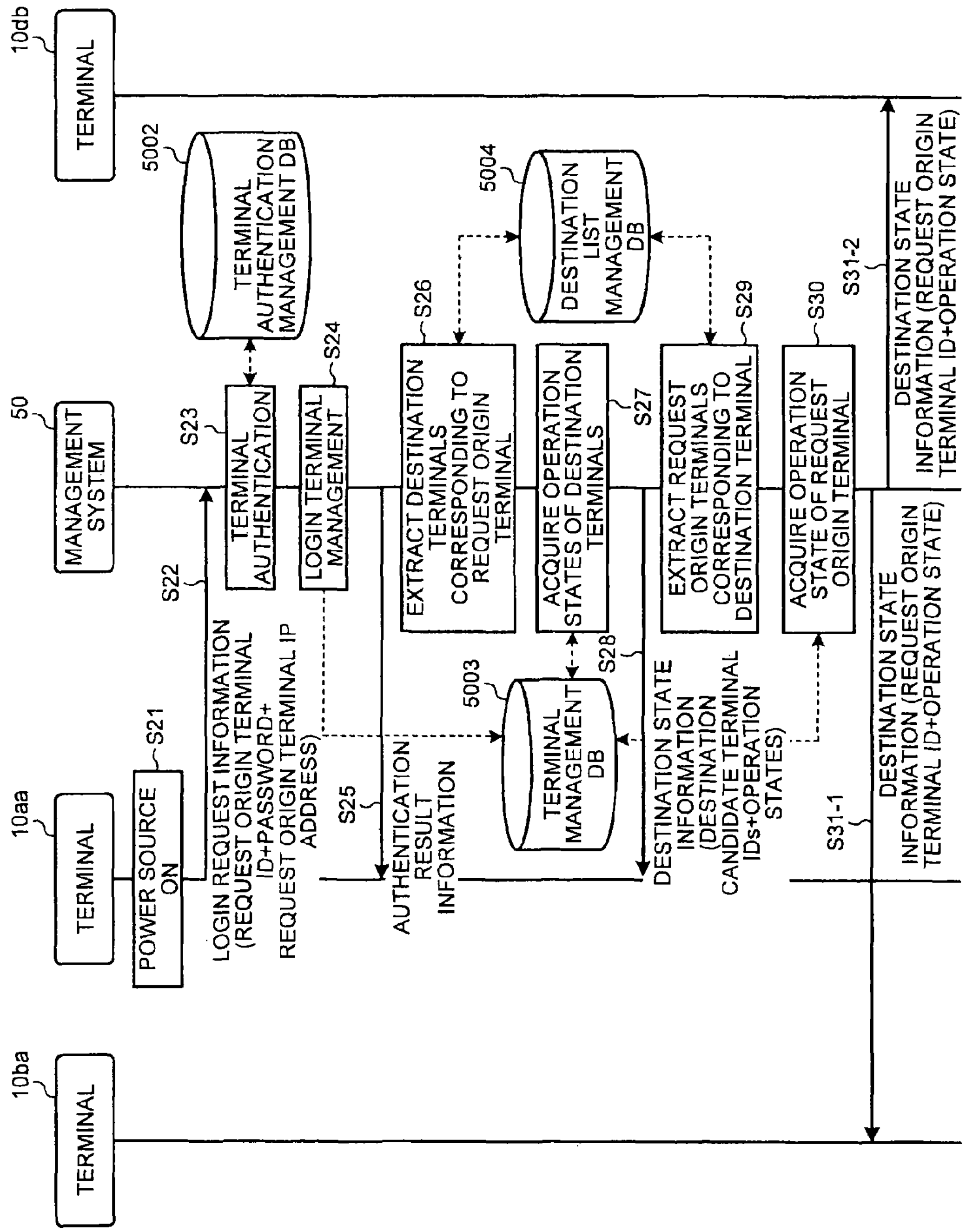
FIG. 20 is a sequence diagram illustrating processing at a preparatory stage in which a preparation is made for starting remote communications between terminals.
Figure 21:
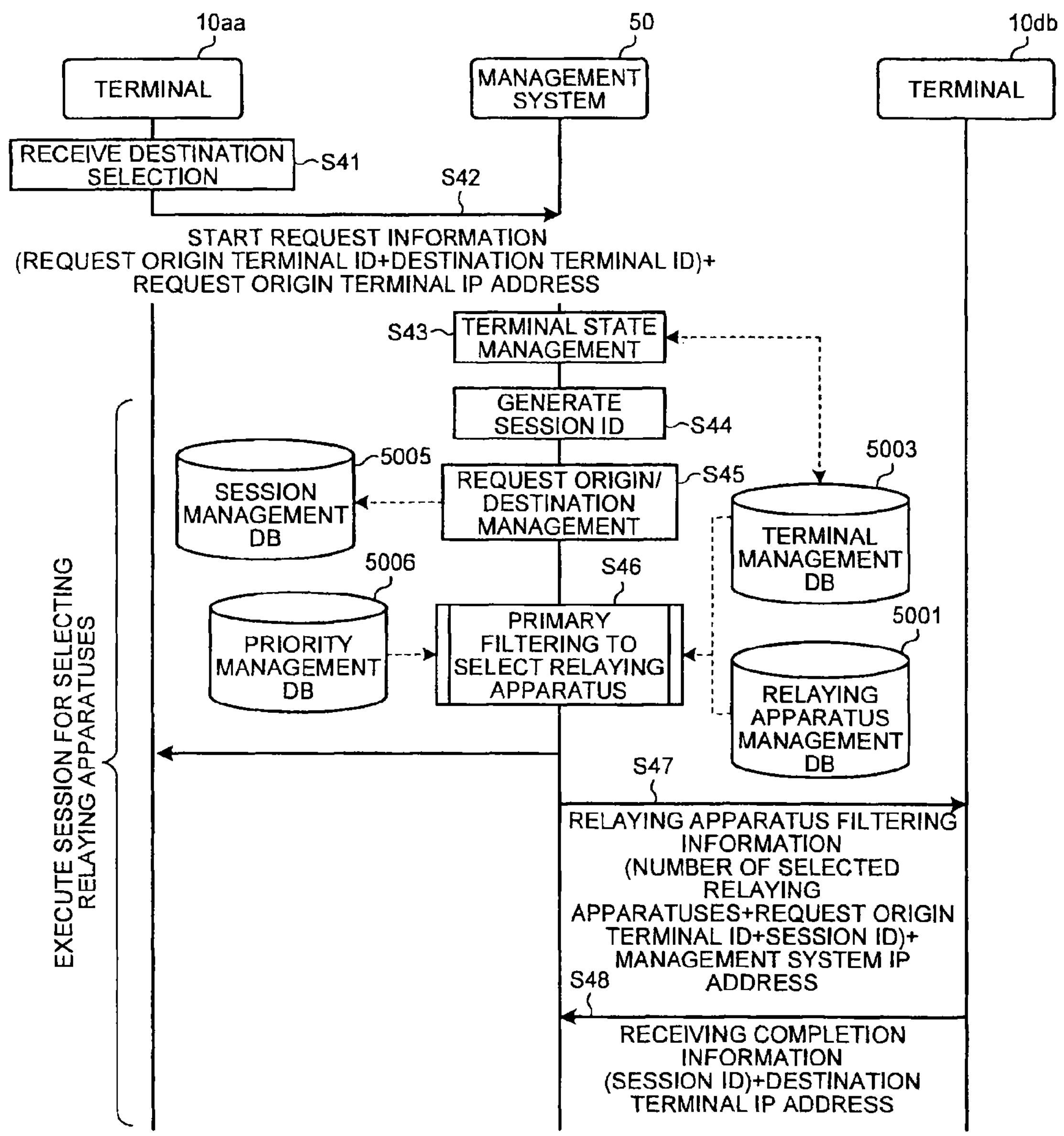
FIG. 21 is a sequence diagram illustrating filtering processing to select the relaying apparatuses.
Figure 22:
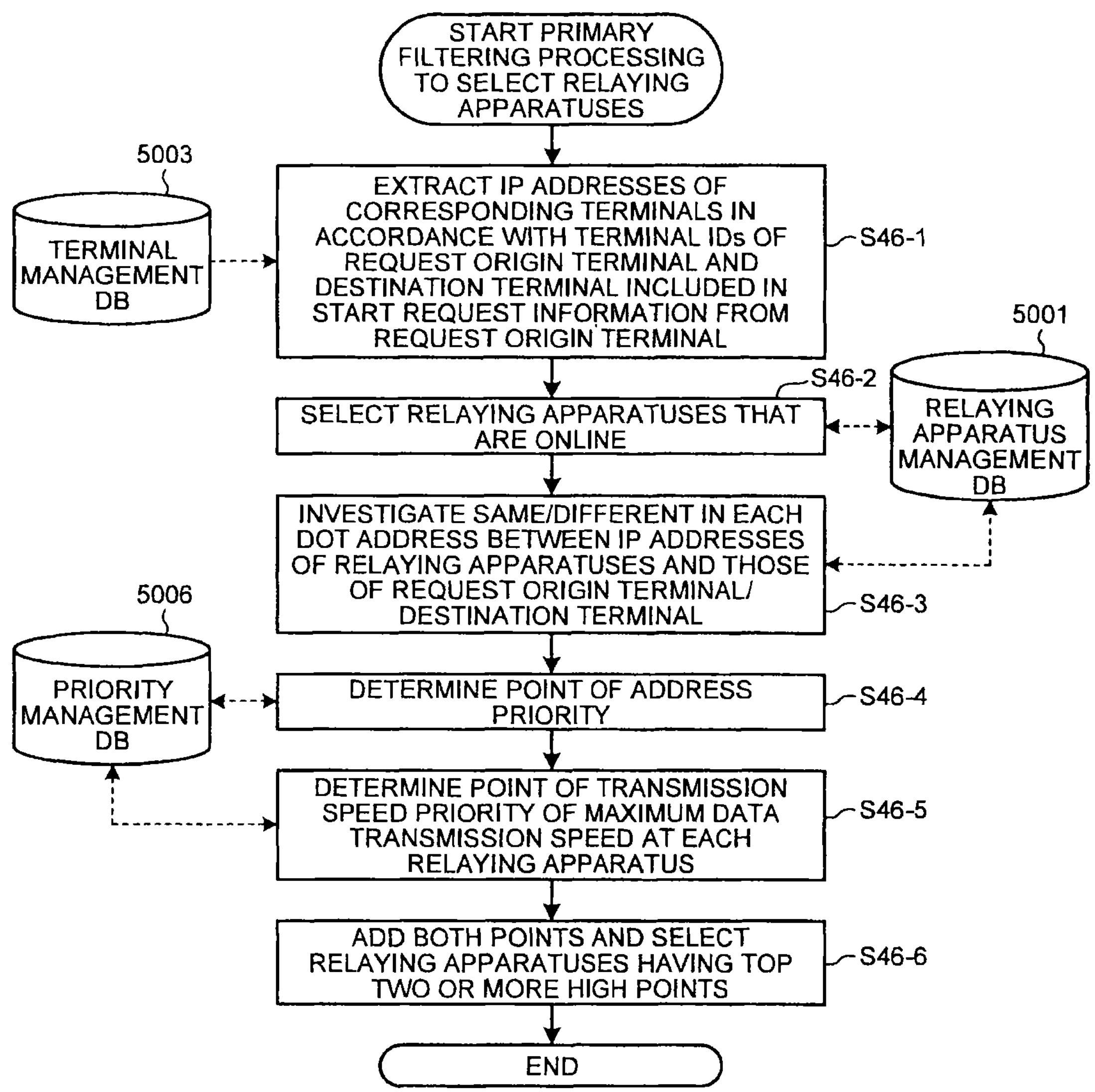
FIG. 22 is a sequence diagram illustrating filtering processing to select the relaying apparatuses.
Figure 24:
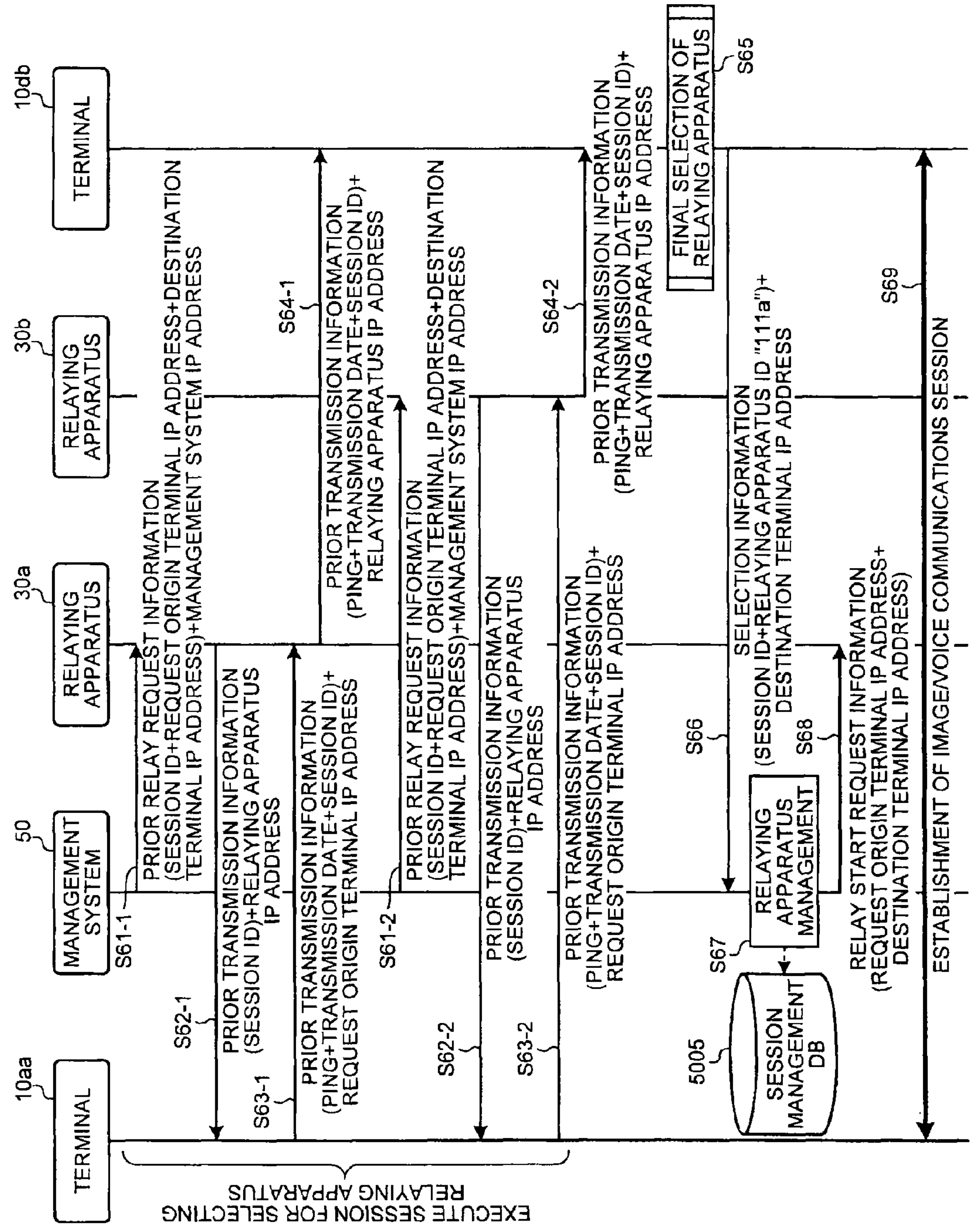
FIG. 24 is a sequence diagram illustrating processing in which the transmission terminal selects the relaying apparatus according to the first embodiment.
Figure 25:
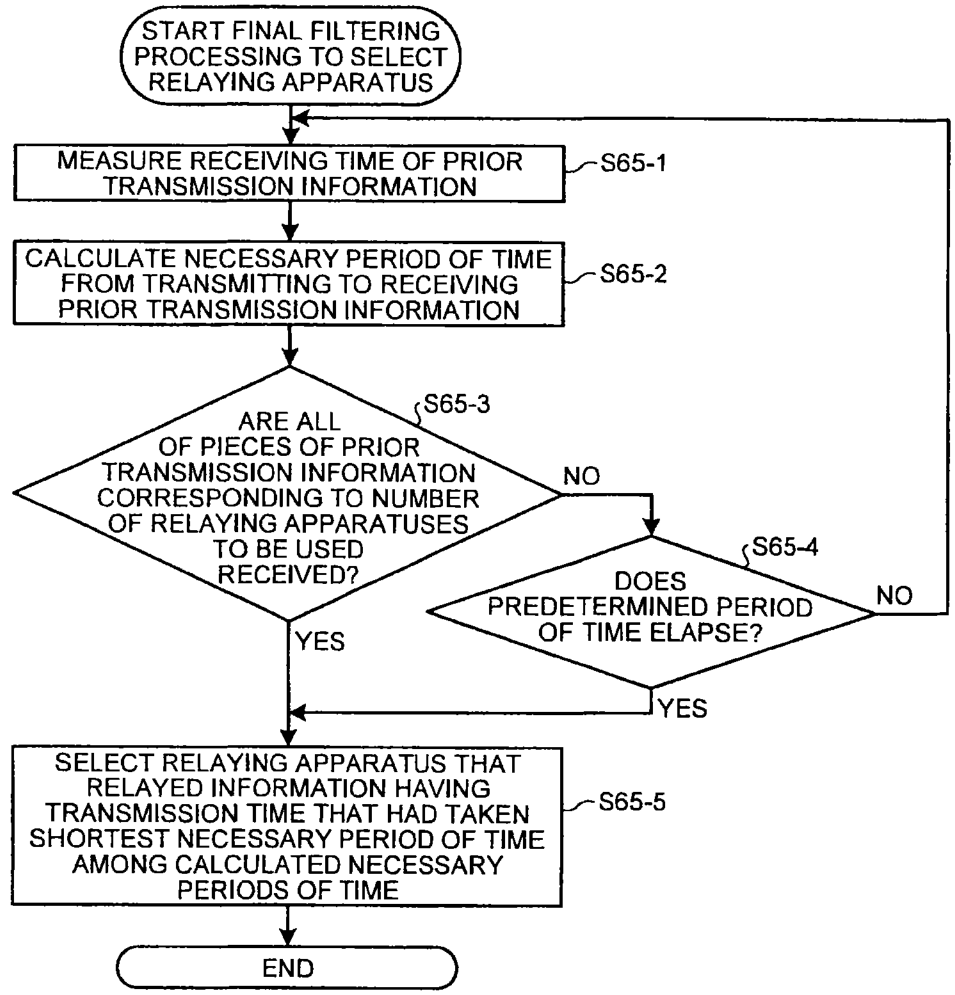
FIG. 25 is a flowchart illustrating processing in which the transmission terminal selects the relaying apparatus.

A processing method of the transmission system 1 according to the embodiment is described below with reference to FIGS. 19 to 33. FIG. 19 is a sequence diagram illustrating processing to manage state information that indicates a state of each relaying apparatus 30 and is transmitted to the management system 50 from each relaying apparatus 30. FIG. 20 is a sequence diagram illustrating processing at a preparatory stage in which a preparation is made for starting a telephone conversation among the terminals 10. FIG. 21 is a sequence diagram illustrating filtering processing to select the relaying apparatuses 30. FIG. 22 is a flowchart illustrating filtering processing to select the relaying apparatuses 30. FIG. 23 is a schematic illustrating calculation of the points of priorities when the filtering processing to select the relaying apparatuses 30 is performed. FIG. 24 is a sequence diagram illustrating processing in which the terminal 10 selects the relaying apparatus 30. FIG. 25 is a flowchart illustrating processing in which the terminal selects the relaying apparatus 30. FIG. 33 is a sequence diagram illustrating processing in which image data and voice data are transmitted and received between the terminals.

First, the processing to manage the state information that indicates a state of each relaying apparatus 30 and is transmitted to the management system 50 from each relaying apparatus 30 is described. In each relaying apparatus 30, the state detection section 32 illustrated in FIG. 7 periodically detects the operation state of the relaying apparatus itself (steps S1-1 to S1-4). The transmitting-receiving section 31 of each relaying apparatus 30 periodically transmits the state information to the management system 50 through the communications network 2 such that the management system 50 manages the operation state of each relaying apparatus 30 in real time (steps S2-1 to S2-4). Each state information includes the relaying apparatus ID and the operation sate, which is detected by the state detection section 32, of the relaying apparatus 30 identified with the relaying apparatus ID. In the embodiment, the relaying apparatuses (30*a*, 30*b*, and 30*d*) are in "online" while being normally operated. On the other hand, the relaying apparatus 30*c* is "offline" though being operated because some sort of failures have occurred in a program for executing relaying operation of the relaying apparatus 30*c*.

In the management system 50, the transmitting-receiving section 51 receives the state information transmitted from each relaying apparatus 30. The management system 50 stores the state information for each relaying apparatus ID in the relaying apparatus management DB 5001 (refer to FIG. 11) of the storage section 5000 through the storage-read processing section 59 and manages them (steps S3-1 to S3-4). As a result, the operation state is stored for each relaying apparatus ID as any one of "online", "offline", and "in failure" in the relaying apparatus management table as illustrated in FIG. 11 and managed. Meanwhile, the receiving date at which the management system 50 received the state information is stored for each relaying apparatus ID and managed. When no state information is transmitted from the relaying apparatus 30, fields of the operation state and the receiving date in each record of the relaying apparatus management table illustrated in FIG. 11 are blank or the operation state and the receiving date of the latest receiving are indicated in the respective fields.

Transmitting-receiving processing of various types of management information at the preparatory state before a telephone conversation starts between the terminals 10*aa* and 10*db* is described below with reference to FIG. 20. In FIG. 20, various types of management information are transmitted and received by the management information session "sei" illustrated in FIG. 2.

Once a user turns ON the power source switch 109 illustrated in FIG. 5, the operation input reception section 12 illustrated in FIG. 7 receives the power source ON and causes the power source to be turned ON (step S21). The login request section 13, once the power source ON is received, automatically transmits the login request information indicating a request for a login to the management system 50 from the transmitting-receiving section 11 through the communications network 2 (step S22). The login request information includes the terminal ID and the password to identify the terminal 10*aa* itself serving as a login request origin. The terminal ID and the password are read from the storage section 1000 through the storage-read processing section 19 and transmitted to the transmitting-receiving section 11 as data. When the login request information is transmitted to the management system 50 from the terminal 10*aa*, the management system 50 serving as the receiving side can grasp the IP address of the terminal 10*ab* serving as the transmission side.

Then, the terminal authentication section 52 of the management system 50 searches the terminal authentication management DB 5002 of the storage section 5000 (refer to FIG. 12) by using the terminal ID and the password that are included in the login request information received through the transmitting-receiving section 51 as searching keys, and performs terminal authentication by determining whether the same terminal ID and password are managed in the terminal authentication management DB 5002 (step S23). If the terminal authentication section 52 determines that the login request is transmitted from the terminal 10 having use authority because the same terminal ID and password are managed, the state management section 53 stores the terminal ID, the operation state, the receiving date of the login request information, and the IP address of the terminal 10*aa* in the terminal management DB 5003 (refer to FIG. 13) in association with each other (step S24). As a result, the terminal management table illustrated in FIG. 13 manages the terminal ID "01aa", the operation state "online", the receiving date "13:40 on November 10, 2009", and the IP address "1.2.1.3" of the terminal 10*aa* in association with each other.

Then, the transmitting-receiving section 51 of the management system 50 transmits authentication result information indicating the authentication result obtained by the terminal authentication section 52 to the request origin terminal (terminal 10*aa*) that has made the login request through the communications network 2 (step S25). In the embodiment, the following description is made on the case in which the request origin terminal is determined as the terminal having use authority by the terminal authentication section 52.

The terminal extraction section 54 of the management system 50 searches the destination list management DB 5004 (refer to FIG. 14) by using the terminal ID "01aa" of the request origin terminal (terminal 10*aa*) that has made the login request as a searching key, and reads and extracts the terminal IDs of the candidates of the destination terminal capable of performing communications with the request origin terminal (terminal 10*aa*) (step S26). In this case, the terminal IDs ("01ab", "01ba", and "01db") of the destination terminals (terminals 10*ab*, 10*ba*, and 10*db*) corresponding to the terminal ID "01aa" of the request origin terminal (terminal 10*aa*) are extracted.

Then, the terminal state extraction section 55 searches the terminal management DB 5003 (refer to FIG. 13) by using the terminal IDs ("01ab", "01ba", and "01db") of the candidates of the destination terminal extracted by the terminal extraction section 54 as searching keys, and reads the operation states ("offline", "online", and "online") corresponding to the respective terminal IDs extracted by the terminal extraction section 54. As a result, the terminal state extraction section 55 acquires the respective operation states of the terminals (10*ab*, 10*ba*, 10*db*) (step S27).

Then, the transmitting-receiving section 51 transmits, to the request origin terminal (terminal 10*aa*) through the communications network 2, destination state information including the terminal IDs ("01ab", "01ba", and "01db") used as the searching keys at step S27 and the respective operation states ("offline", "online", and "online") of the destination terminals (terminals 10*ab*, 10*ba*, and 10*db*) corresponding to the respective terminal IDs (step S28). As a result, the request origin terminal (terminal 10*aa*) can grasp the respective current operation states ("offline", "online", and "online") of the terminals (10*ab*, 10*ba*, and 10*db*) that are the candidates of the destination terminal capable of performing communications with the request origin terminal (terminal 10*aa*).

Furthermore, the terminal extraction section 54 of the management system 50 searches the destination list management DB 5004 (refer to FIG. 14) by using the terminal ID "01aa" of the request origin terminal (terminal 10*aa*) that has made the login request as a searching key, and extracts the terminal IDs of the other request origin terminals that register the terminal ID "01aa" of the request origin terminal (terminal 10*aa*) as the candidate of the destination terminal (step S29). In the destination list management table illustrated in FIG. 14, the terminal IDs "01ab", "01ba", and "01db" of the other request origin terminals are extracted.

Then, the terminal state extraction section 55 of the management system 50 searches the terminal management DB 5003 (refer to FIG. 13) by using the terminal ID "01aa" of the request origin terminal (terminal 10*aa*) that has made the login request as a searching key, and acquires the operation state of the request origin terminal (terminal 10*aa*) that has made the login request (step S30).

Then, the transmitting-receiving section 51 transmits the destination state information including the terminal ID "01aa" of the request origin terminal (terminal 10*aa*) and the operation state "online" that are acquired at step S30 to the terminals (10*ba* and 10*db*) each operation state of which is "online" in the terminal management DB 5003 (refer to FIG. 13) among the terminals (10*ab*, 10*ba*, and 10*db*) that are identified with the terminal IDs ("01ab", "01ba", and "01db") extracted at step S29 (steps S31-1 and S31-2). When transmitting the destination state information to the terminals (10*ba* and 10*db*), the transmitting-receiving section 51 refers to the IP addresses of the terminals managed by the terminal management table illustrated in FIG. 13 in accordance with the terminal IDs ("01ba" and "01db"). As a result, the terminal ID "01aa" and the operation state "online" of the request origin terminal (terminal 10*aa*) that has made the login request can be transmitted to each of the other destination terminals (terminals 10*db* and 10*ba*) capable of performing communications with the request origin terminal (terminal 10*aa*) that has made the login request as the destination.

In each of the other terminals 10, once a user turns ON the power source switch 109 illustrated in FIG. 6, the operation input reception section 12 illustrated in FIG. 7 receives the power source ON in the same manner as step S21, and performs the processing in the same manner as steps S22 to S31-1 and S31-2. The description thereof is thus omitted.

The processing to select the relaying apparatuses 30 is described below with reference to FIG. 21. In FIG. 21, various types of management information are totally transmitted and received by the management information session "sei" illustrated in FIG. 21. In the embodiment, the request origin terminal (terminal 10*aa*) can have a telephone conversation with at least one of the terminals (10*ba*, 10*db*) the operation states of which are online, which are indicated in the state information received at step S31-2, among the terminals 10 serving as the candidates of the destination. The following description is made on the case in which a user who uses the request origin terminal (terminal 10*aa*) selects a start of a telephone conversation with the destination terminal (terminal 10*db*).

Once the user presses the operation button 108 illustrated in FIG. 5 so as to select the terminal 10*db*, the operation input reception section 12 illustrated in FIG. 7 receives a request for starting a telephone conversation with the destination terminal (terminal 10*db*) (step S41). Then, the transmitting-receiving section 11 of the request origin terminal (terminal 10*aa*) transmits the start request information that includes the terminal ID "01aa" of the terminal 10*aa* and the terminal ID "01db" of the destination terminal (terminal 10*db*) and indicates that a telephone conversation is to be started to the management system 50 (step S42). As a result, the transmitting-receiving section 51 of the management system 50 receives the start request information and can grasp the IP address "1.2.1.3" of the request origin terminal (terminal 10*aa*) serving as the transmission origin.

The state management section 53 changes both fields of the operation state in the records respectively including the terminal IDs "01aa" and "01db" of the terminal management table of the terminal management DB 5003 (refer to FIG. 13) to "busy" in accordance with the terminal ID "01aa" of the request origin terminal (terminal 10*aa*) and the terminal ID "01db" of the destination terminal (terminal 10*db*) that are included in the start request information (step S43). In this case, the request origin terminal (terminal 10*aa*) and the destination terminal (terminal 10*db*) are busy and do not start a telephone conversation. If the other terminals 10 tend to have a telephone conversation with the request origin terminal (terminal 10*aa*) or the destination terminal (terminal 10*db*), a notification sound or display that indicates so-called busy is output.

The processing to execute the session for selecting the relaying apparatuses 30 is described below. The selection session ID generation section 56*a* illustrated in FIG. 9 generates the selection session ID used for executing a session for selecting the relaying apparatuses 30 (step S44). The session management section 57 stores a selection session ID "se1" generated at step S44, the terminal ID "01aa" of the request origin terminal (terminal 10*aa*), and the terminal ID "01db" of the destination terminal (terminal 10*db*) in the session management DB 5005 (refer to FIG. 15) of the storage section 5000 and manages them in association with each other (step S45).

Then, the primary filtering section 56 of the management system 50 illustrated in FIG. 7 performs the primary filtering for the relaying apparatus 30 that relays a telephone conversation between the request origin terminal (terminal 10*aa*) and the destination terminal (terminal 10*db*) in accordance with the relaying apparatus management DB 5001, the terminal management DB 5003, and the priority management DB 5006 (step S46).

The processing performed at step S46 is described in further detail below with reference to FIGS. 9 and 22. First, the terminal IP address extraction section 56*b* illustrated in FIG. 9 searches the terminal management DB 5003 (refer to FIG. 13) in accordance with the terminal ID "01aa" of the request origin terminal (terminal 10*aa*) and the terminal ID "01db" of the destination terminal (terminal 10*db*) that are included in start communications request information transmitted from the request origin terminal (terminal 10*aa*), and extracts the IP addresses ("1.2.1.3" and "1.3.2.4") of the terminals (10*aa* and 10*db*) respectively corresponding to the terminal IDs "01aa" and "01db" (step S46-1).

Then, the primary selection section 56*c* selects the respective relaying apparatus IDs (111*a*, 111*b*, and 111*d*) of the relaying apparatuses (30*a*, 30*b*, and 30*d*) the operation states of which are "online" among the relaying apparatuses 30 managed by the relaying apparatus management DB 5001 (refer to FIG. 11) (step S46-2). In addition, the primary selection section 56*c* searches the relaying apparatus management DB 5001 (refer to FIG. 11) in accordance with the IP address "1.2.1.3" of the request origin terminal (terminal 10*aa*) and the IP address "1.3.2.4" of the destination terminal (terminal 10*db*) that are extracted at step S46-1, and investigates whether each dot address of the IP addresses ("1.2.1.2", "1.2.2.2", and "1.3.2.2") of the relaying apparatuses (30*a*, 30*b*, and 30*d*) selected at step S46-2 is the same as or different from each dot address of the IP addresses ("1.2.1.3" and "1.3.2.4") of the request origin terminal (terminal 10*aa*) and the destination terminal (terminal 10*db*) (step S46-3).

Then, the priority determination section 56*d* determines the point of the address priority for each of the relaying apparatuses (30*a*, 30*b*, and 30*d*) investigated at step S46-3 with reference to the priority management DB 5006 (refer to FIG. 16) (step S46-4). The results of the determination processing are illustrated in the table of FIG. 23. FIG. 23 is a schematic illustrating the calculation of the points of priorities when the filtering processing to select the relaying apparatuses 30 is performed. FIG. 23 illustrates the point of the address priority, the point of the transmission speed priority, and the total point for each relaying apparatus ID. The point of the address priority is further classified into the point of each relaying apparatus 30 with respect to the request origin terminal (terminal 10*aa*) and the point with respect to the destination terminal (terminal 10*db*). The total point is the sum of the higher point in the two points of the address priority and the point of transmission speed priority.

In the embodiment, the IP address "1.2.1.2" of the relaying apparatus 30*a* is expressed as "same.same.same.different" with respect to the IP address "1.2.1.3" of the request origin terminal (terminal 10*aa*). As a result, the point of the address priority is "5" as illustrated in FIG. 23. As illustrated in FIG. 1, the IP address of the relaying apparatus 30*a* is "1.2.1.2" while the IP address of the destination terminal (terminal 10*db*) is "1.3.2.4". Accordingly, the IP address of the relaying apparatus 30*a* is expressed as "same.different.different.different" as illustrated in FIG. 16 with respect to the IP address of the destination terminal (terminal 10*db*). As a result, the point of the address priority is "1" as illustrated in FIG. 23. The IP address "1.2.2.2" of the relaying apparatus 30*b* is expressed as "same.same.different.different" with respect to the IP address "1.2.1.3" of the request origin terminal (terminal 10*aa*). As a result, the point of the address priority is "3". The IP address "1.2.2.2" of the relaying apparatus 30*b* is expressed as "same.different.same.different" with respect to the IP address "1.3.2.4" of the destination terminal (terminal 10*db*). As a result, the point of the address priority is "1". The IP address "1.3.2.2" of the relaying apparatus 30*d* is expressed as "same.different.different.different" with respect to the IP address "1.2.1.3" of the request origin terminal (terminal 10*aa*). As a result, the point of the address priority is "1". The IP address "1.3.2.2" of the relaying apparatus 30*d* is expressed as "same.same.same.different" with respect to the IP address "1.3.2.4" of the destination terminal (terminal 10*db*). As a result, the point of the address priority is "5".

Referring back to FIG. 22, the priority determination section 56*d* searches the priority management DB 5006 (refer to FIG. 17) in accordance with the maximum data transmission speed of each relaying apparatus 30 managed by the relaying apparatus management DB 5001 (refer to FIG. 11), and determines the point of the transmission speed priority for each of the relaying apparatuses (30*a*, 30*b*, and 30*d*) selected by the primary filtering processing performed at step S46-2 (step S46-5). In the embodiment, the maximum data transmission speed of the relaying apparatus 30*a* is 100 (Mbps) as illustrated in FIG. 11. Accordingly, the point of the transmission speed priority is determined as 3 with reference to the transmission speed priority illustrated in FIG. 17. Likewise, the maximum data transmission speed of the relaying apparatus 30*b* is calculated as 1000 (Mbps). Accordingly, the point of the transmission speed priority is determined as 5. Likewise, the maximum data transmission speed of the relaying apparatus 30*d* is calculated as 10 (Mbps). Accordingly, the point of transmission speed priority is determined as 1.

Then, the primary selection section 56*c* selects two relaying apparatuses 30 having the top two total high points among the relaying apparatuses (30*a*, 30*b*, and 30*d*) each of which has the total point that is the sum of the point of the transmission speed priority and the higher point in the address priority, which is the point with respect to either one of the terminals (10*aa* and 10*db*) (step S46-6). In the embodiment, the total points of the respective relaying apparatus IDs (111*a*, 111*b*, and 111*d*) are "8", "8", and "6" as illustrated in FIG. 23. Accordingly, the relaying apparatus 30*a* having the relaying ID "111a" and the relaying apparatus 30*b* having the relaying apparatus ID "111b" are selected.

After the filtering processing at step S46 is complete, the transmitting-receiving section 51 illustrated in FIG. 7 transmits relaying apparatus filtering information for transferring the number of relaying apparatuses 30 selected as described above to the destination terminal (terminal 10*db*) through the communications network 2 (step S47). The relaying apparatus filtering information includes the number of relaying apparatuses 30 selected at step S46, which is "2", the terminal ID "01aa" of the request origin terminal (terminal 10*aa*), and the selection session ID "se1". As a result, the terminal 10*db* can grasp the number of relaying apparatuses 30 and from which terminal 10 a request for starting a telephone conversation is made in the execution of the session performed by using the selection session ID "se1", and the IP address "1.1.1.2" of the management system 50 serving as the transmission origin of the relaying apparatus filtering information.

Then, the terminal 10*db* transmits receiving completion information indicating the completion of the receiving of the relaying apparatus filtering information to the management system 50 from the transmitting-receiving section 11 through the communications network 2 (step S48). The receiving completion information includes the session ID "se1". As a result, the management system 50 can grasp that the transfer of the number of relaying apparatuses in the session executed by using the session ID "se1" is complete and the IP address "1.3.2.4" of the destination terminal (terminal 10*db*) serving as the transmission origin.

Processing in which the destination terminal (terminal 10*db*) selects the relaying apparatus 30 is described below with reference to FIGS. 24 and 25. In FIG. 24, various types of management information are totally transmitted and received by the management information session "sei" illustrated in FIG. 2.

The management system 50 transmits prior relay request information indicating that a relay request is to be made preliminarily, to each of the relaying apparatuses (30*a* and 30*b*) selected at step S46 prior to starting a telephone conversation in a television conference (steps S61-1 and S61-2). The prior relay request information includes the session ID "se1", the IP address "1.2.1.3" of the request origin terminal (terminal 10*aa*), and the IP address "1.3.2.4" of the destination terminal (terminal 10*db*). As a result, each of the relaying apparatuses (30*a* and 30*b*) can grasp that which selection session is used, which terminal is the request origin terminal, and which terminal is the destination terminal, and the IP address "1.1.1.2" of the management system 50 serving as the transmission origin of the prior relay request information.

Then, each of the relaying apparatuses (30*a* and 30*b*) transmits prior transmission request information indicating that the request origin terminal (terminal 10*aa*) is requested to transmit the prior transmission information including ping (Packet Internet Groper), which is described later, to each of the relaying apparatuses (30*a* and 30*b*) themselves before the start of a telephone conversation with the request origin terminal grasped at steps S61-1 and S61-2 from the transmitting-receiving section 31 through the communications network 2 (steps S62-1 and S62-2). The prior transmission information includes the session ID "se1". As a result, the request origin terminal (terminal 10*aa*) can grasp the transmission of the prior transmission request information to each of the relaying apparatuses (30*a* and 30*b*) and the respective IP addresses ("1.2.1.2" and "1.2.2.2") of the relaying apparatuses (30*a* and 30*b*) each serving as the transmission origin of the prior transmission request information, in the selection processing of the relaying apparatus 30 executed by using the session ID "se1".

In this way, the IP address of the destination terminal is not notified to the request origin terminal directly from the management system 50 while the IP address of the destination terminal is notified to the relaying apparatus 30*a* as described at step S61-1 and the relaying apparatus 30*a* requests the request origin terminal to transmit the prior transmission request information to the relaying apparatus itself (relaying apparatus 30*a*). This is because the notification of no IP addresses of the other terminals 10 to each terminal 10 secures security.

Then, the request origin terminal (terminal 10*aa*) transmits the prior transmission information to each of the relaying apparatuses (30*a* and 30*b*) from the transmitting-receiving section 11 through the communications network 2 (steps S63-1 and S63-2). The prior transmission information is transmitted to the destination terminal (the terminal 10*db*) via respective relaying apparatuses (30*a* and 30*b*), instead of and prior to transmitting the image data and the voice data. This is for measuring a necessary time period from a time when the request origin terminal (terminal 10*aa*) transmits the information to a time when the destination terminal (terminal 10*db*) receives the information. The prior transmission information includes the ping to confirm that the request origin terminal (terminal 10*aa*), the relaying apparatuses (30*a* and 30*b*), and the destination terminal (terminal 10*db*) are connected so as to enable communications therebetween, a transmission date at which the prior transmission information has been transmitted from the request origin terminal (terminal 10*aa*), and the session ID "se1". As a result, each of the relaying apparatuses (30*a* and 30*b*) can grasp that the prior transmission information has been transmitted in the execution of the session using the selection session ID "se1" and the IP address "1.2.1.3" of the request origin terminal (terminal 10*aa*) serving as the transmission origin of the prior transmission information.

Then, each of the relaying apparatuses (30*a* and 30*b*) relays the prior transmission information to the IP address "1.3.2.4" of the destination terminal (terminal 10*db*) included in the prior relay request information received at steps S61-1 and S61-2 (steps S64-1 and S64-2). As a result, the destination terminal (terminal 10*db*) can grasp that the prior transmission information has been transmitted in the execution of the session using the selection session ID "se1" and the IP addresses ("1.2.1.2" and "1.2.2.2") of the relaying apparatuses (30*a* and 30*b*) serving as the transmission origin (relaying origin) of the prior transmission information.

Then, the final filtering section 16 of the destination terminal (terminal 10*db*) finally selects the relaying apparatus 30 that relays image data and voice data in telephone conversations in the telephone conference in accordance with the prior transmission information (step S65).

The processing performed at step S65 is described in further detail below with reference to FIGS. 8 and 25. First, the measurement section 16*a* of the final filtering section 16 illustrated in FIG. 8 measures the receiving date at which the transmitting-receiving section 11 of the terminal 10*db* received the prior transmission information for each prior transmission information relayed by the relaying apparatuses (30*a* and 30*b*) (step S65-1). Then, the calculation section 16*b* calculates the necessary time period from a time when the prior transmission information is transmitted to a time when the prior transmission information is received in accordance with the difference between the aforementioned receiving date and the transmission date which is included in the prior transmission information, for each prior transmission information the receiving time of which has been measured (step S65-2). Then, the final selection section 16*c* determines whether all of the pieces of prior transmission information corresponding to the number of relaying apparatuses 30 to be used for relaying, which is "2", are received in the execution of the session using the session ID "se1" (step S65-3). If all of the pieces of prior transmission information are not received (NO), the final selection section 16*c* determines whether a predetermined period of time (in this case, one minute) elapses from when the terminal 10*db* received the prior transmission information (step S65-4). If the predetermined period of time does not elapse (NO), the processing returns to step S65-1. On the other hand, if all of the pieces of prior transmission information are received (YES at step S65-3), or if the predetermined period of time elapses (YES at step S65-4), the final selection section 16*c* selects the relaying apparatus 30 that relayed the prior transmission information that had taken the shortest necessary period of time among the necessary periods of time calculated by the calculation section 16*b* (step S65-5). In the embodiment, the relaying apparatus 30*a* is selected as an example on the assumption that the necessary period of time from transmitting to receiving of the prior transmission information relayed by the relaying apparatus 30*a* is shorter than that of the prior transmission information relayed by the relaying apparatus 30*b*.

Then, the destination terminal (terminal 10*db*) transmits selection information indicating that the relaying apparatus 30*a* has been selected to the management system 50 from the transmitting-receiving section 11 through the communications network 2 (step S66). The selection information includes the session ID "se1" and the relaying apparatus ID "111a" of the selected relaying apparatus 30*a*. As a result, the management system 50 can grasp that the relaying apparatus 30*a* has been selected in the execution of the session using the session ID "se1", and the IP address "1.3.2.4" of the destination terminal (terminal 10*db*) serving as the transmission origin of the selection information.

Then, the session management section 57 of the management system 50 stores the relaying apparatus ID "111a" of the finally selected relaying apparatus 30*a* in a field of the relaying apparatus ID of a record including the session ID "se1" in the session management table of the session management DB 5005 (refer to FIG. 15) and manages it (step S67). Then, the transmitting-receiving section 51 of the management system 50 transmits relay start request information indicating a request for starting a relay to the relaying apparatus 30*a* through the communications network 2 (step S68). The relay start request information includes the respective IP addresses ("1.2.1.3" and "1.3.2.4") of the request origin terminal (terminal 10*aa*) and the destination terminal (terminal 10*db*) that are the relay destinations. As a result, the relaying apparatus 30*a* can grasp that the relaying apparatus 30*a* itself has been selected and establish a session for transmitting three pieces of image data of low resolution, medium resolution, and high resolution and voice data between the terminals (10*aa* and 10*db*) (step S69). Accordingly, the terminals (10*aa* and 10*db*) can start a telephone conversation in a television conference.

Incidentally, at the step S47, the management system 50 transmits the relay apparatus filtering information to the destination terminal (terminal 10*db*), so that the selecting process is performed at the destination terminal (terminal 10*db*) side (step S65) through the steps S48 to S64-1 and S64-2. The process is not limited to this. For example, at the step S47, the management system 50 may transmit the relay apparatus filtering information to the request origin terminal (terminal 10*aa*), so that the request origin terminal (terminal 10*aa*) is switched with the destination terminal (terminal 10*db*) in transmitting and receiving the various types of information until the steps S64-1 and S64-2. As a result, the request origin terminal (terminal 10*aa*) can perform the selection processing of the relaying apparatus instead of the processing at step S65 and transmit the selection information instead of the processing at step S66.

Figure 26:
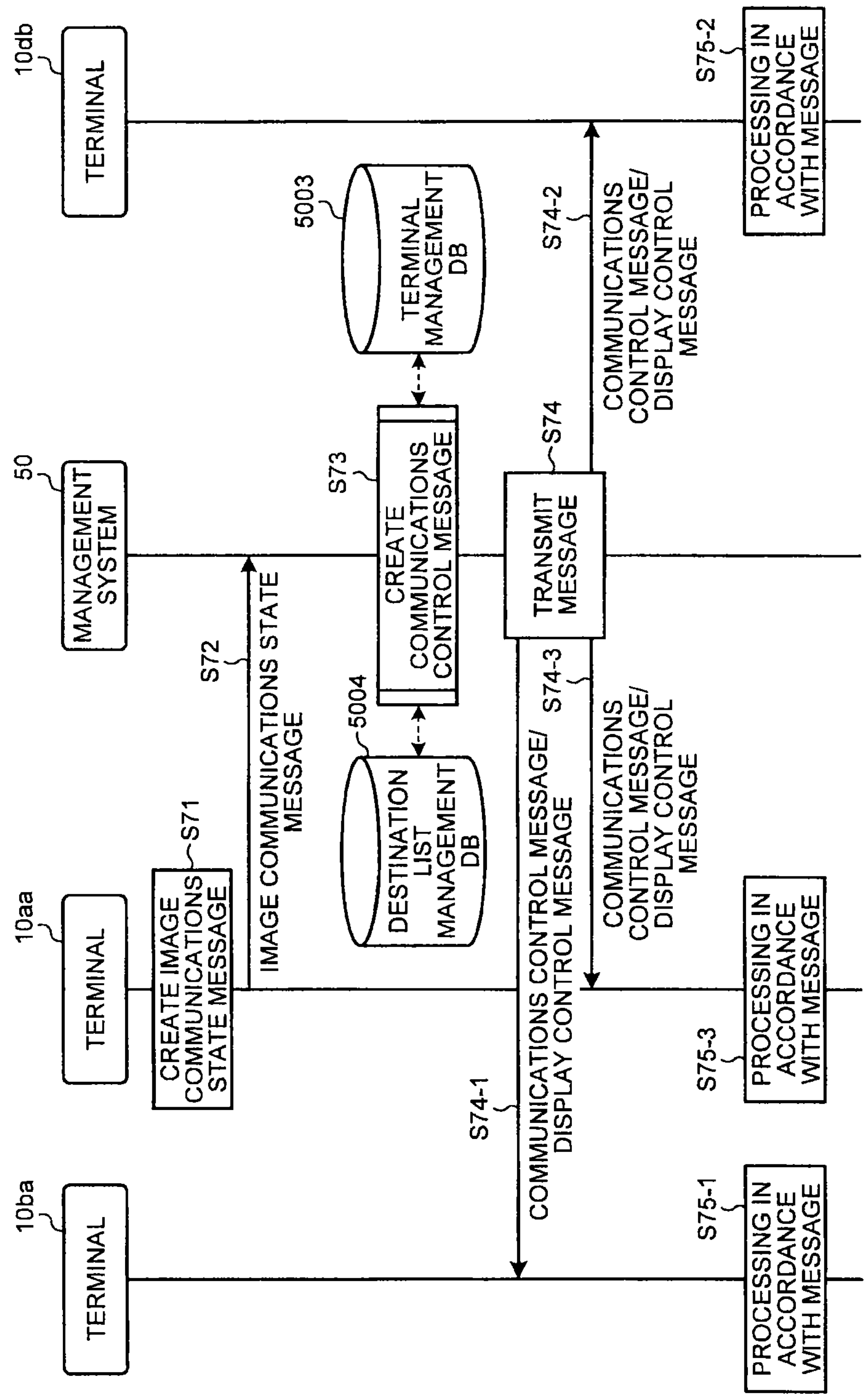
FIG. 26 is a sequence diagram illustrating processing to create, transmit and receive a communications control message.
Figure 27:
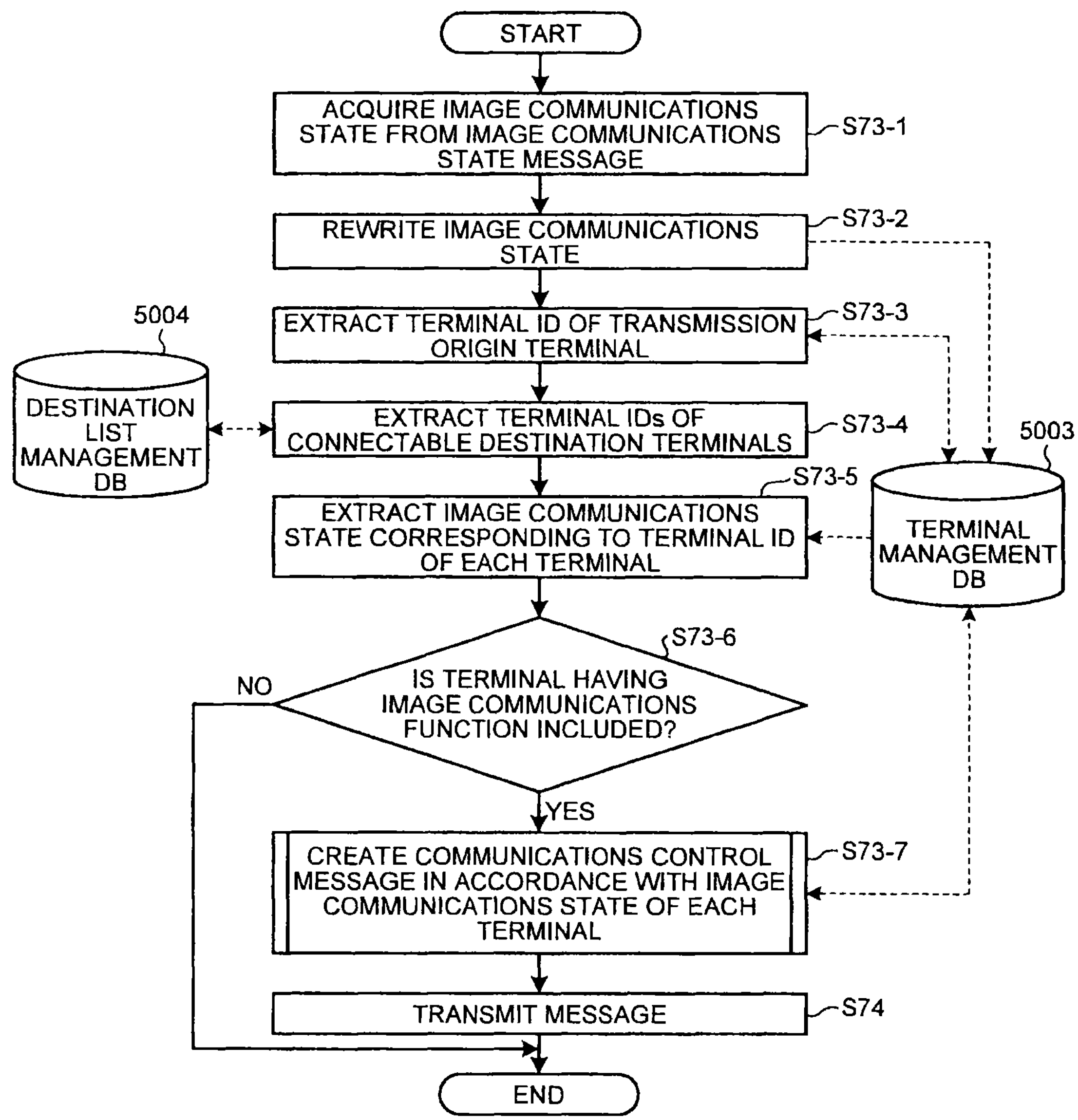
FIG. 27 is a flowchart illustrating processing to mainly create the communications control message.

Processing is described below with reference to FIGS. 26 to 28, which is performed after a communications control message is created and transmitted to each terminal 10 and before each terminal 10 executes processing in accordance with the communications control message when a television conference is held at multiple sites (terminals 10). FIG. 26 illustrates a case in which a television conference is held among three terminals 10*aa*, 10*ba*, and 10*db*. FIG. 26 is a sequence diagram illustrating processing to create, transmit and receive the communications control message. FIG. 27 is a flowchart illustrating processing to mainly create the communications control message. FIG. 28 is a flowchart illustrating a part of processing to create the communications control message in detail. In the embodiment, a case is described in which a conference is held among the three terminals (10*aa*, 10*ba*, 10*db*) serving as the multiple sites.

As illustrated in FIG. 26, the message creation section 20 of each terminal 10 (in this case, the terminal 10*aa*) reads the preliminarily stored image communications state information from the storage section 1000 and creates the image communications state message (m) including the image communications state information (step S71). The image communications state message (m) includes the IP address "1.2.1.3" of the terminal 10*aa*. The image communications state message (m) may include the destination name instead of the IP address. The image communications state message (m) can be created in a XML (eXtensible Markup Language) format according to XMPP (eXtensible Messaging and Presence Protocol) of RFC3921, for example. The communications control message and a display control message, which are described later, can be also created in the same format.

Then, the transmitting-receiving section 11 of the terminal 10*aa* transmits the image communications state message (m) created at step S71 to the management system 50 through the communications network 2 (step S72). As a result, the transmitting-receiving section 51 of the management system 50 receives the image communications state message (m).

Then, the message creation section 61 of the management system 50 creates communications control messages in accordance with the image communications states of the respective terminals 30 (step S73). Step S73 is described in detail with reference to FIG. 27.

The message creation section 61 acquires the image communications state information relating to the terminal 10*aa* serving as the transmission origin and the IP address "1.2.1.3" of the terminal 10*aa* from the image communications state message (m) received by the transmitting-receiving section 51 (step S73-1). Then, the message creation section 61 rewrites the attribute of the image communications state corresponding to the IP address acquired at step S73-1 in the terminal management DB 5003 (refer to FIG. 13) by overwriting it with the image communications state information acquired at step S73-1 (step S73-2).

Then, the message creation section 61 extracts the terminal ID corresponding to the IP address acquired at step S73-1 from the terminal management DB 5003 (refer to FIG. 13) (step S73-3).

Then, the terminal extraction section 54 searches the destination list management DB 5004 by using the terminal ID extracted at step S73-3 as the terminal ID of the request origin terminal, and extracts all of the terminal IDs of the destination terminals corresponding to the extracted terminal ID (step S73-4). The terminal state extraction section 55 searches the terminal management DB 5003 (refer to FIG. 13) in accordance with the terminal IDs of the destination terminals and extracts the image communications state information corresponding to each of the terminal IDs (step S73-5).

Then, the message creation section 61 determines whether each of the request origin terminal and all of the destination terminals has the image communications function with reference to the image communications state information extracted at step S73-5 (step S73-6). If the request origin terminal and all of the destination terminals has no image communications function (NO), the processing at step S73 ends. In this case, message transmission processing (refer to FIGS. 26 and 27) performed at step S74, which is described later, is not performed.

On the other hand, if the request origin terminal and any of all of the destination terminals have the image communications function (YES), the message creation section 61 creates the communications control message, which is described later, in accordance with the image communications state of each terminal 10 (step S73-7).

Step S73-7 is described in detail below with reference to FIG. 28. The message creation section 61 determines whether two or more terminals 10 are performing image communications among the terminals (10*aa*, 10*ba*, and 10*db*) in telephone conversations made among the multiple sites with reference to the image communications states extracted at step S73-5 (step S101). If it is determined that the terminals 10 are performing image communications (YES at step S101), the message creation section 61 further determines whether the terminal 10 that is halting image communications is included in the remaining terminals 10 (step S102). If it is determined that the terminal 10 that is halting image communications is included (YES at step S102), the terminal state extraction section 55 extracts the IP address of the terminal 10 that is halting image communications and for which it is determined that it is included at step S102 with reference to the terminal management DB 5003 (refer to FIG. 13) (step S103). The message creation section 61 creates a communications control message (M3) indicating that the terminals are performing image communications (step S104). Specifically, the communications control message (M3) includes a message "MESSAGE_IMAGE_ON", the IP address of the transmission destination extracted at step S103, and the IP address of the management system 50 serving as the transmission origin.

On the other hand, if it is determined that the terminals 10 are not performing image communications (NO at step S101), the message creation section 61 determines whether only a single terminal 10 is performing image communications with reference to the image communications states extracted at step S73-5 (step S105). If it is determined that only a single terminal 10 is performing image communications (YES at step S105), the message creation section 61 further determines whether all of the other terminals 10 excluding the terminal 10 that is performing the image communications have no image communications function with reference to the image communications states extracted at step S73-5 (step S106). If it is determined that all of the other the terminals 10 excluding the terminal 10 in the image communications have no image communications functions (YES at step S106), the terminal state extraction section 55 extracts the IP address of the single terminal 10 for which it is determined that it is performing image communications at step S105 with reference to the terminal management DB 5003 (refer to FIG. 13) (step S107). The message creation section 61 creates a communications control message (M4) indicating that the image communications is forcibly stopped (step S108). Specifically, the communications control message (M4) includes a message "DATA_IMAGE_OFF", the IP address of the transmission destination extracted at step S107, and the IP address of the management system 50 serving as the transmission origin.

On the other hand, if it is not determined that all of the terminals 10 excluding the terminal 10 that is performing the image communications have no image communications functions (NO at step S106), i.e., it is determined that at least one of the terminals 10 excluding the terminal 10 that is performing the image communications has the image communications function, the message creation section 61 further determines whether the terminal 10 that is halting image communications is included in the terminals 10 having the image communications functions with reference to the image communications states extracted at step S73-5 (step S109). If it is determined that the terminal 10 that is halting image communications is included (YES at step S109), the terminal state extraction section 55 extracts the IP address of the terminal 10 that is performing image communications and for which it is determined that it is included at step S105 with reference to the terminal management DB 5003 (refer to FIG. 13) (step S110). The message creation section 61 creates a communications control message (M1) indicating that the terminals are halting image communications (step S111). Specifically, the communications control message (M1) includes the message "MESSAGE_IMAGE_OFF", the IP address of the transmission destination extracted at step S110, and the IP address of the management system 50 serving as the transmission origin.

The terminal state extraction section 55 further extracts the IP address of the terminal 10 that is halting image communications and for which it is determined that it is included at step S109 with reference to the terminal management DB 5003 (refer to FIG. 13) (step S112). The message creation section 61 creates a communications control message (M2) indicating that the other single terminal is performing image communications (step S113). Specifically, the communications control message (M2) includes the message "MESSAGE_IMAGE_ON", the IP address of the transmission destination extracted at step S112, and the IP address of the management system 50 serving as the transmission origin.

On the other hand, the terminal state extraction section 55 extracts the IP address of the terminal 10 for which it is determined that it has the image communications function at step S73-6 with reference to the terminal management DB 5003 (refer to FIG. 13) in any one of the following cases: (1) if it is not determined that the terminal 10 that is halting image communications is included in the remaining terminals 10 (NO at step S102), (2) if it is not determined that only the single terminal 10 is performing image communications (NO at step S105), i.e., no terminal 10 is performing image communications, and (3) it is not determined that the terminal 10 that is halting image communications is included (NO at step S109) (step S114). The message creation section 61 creates a display control message (M5) indicating that a specified display message displayed on each display 120 of the terminals 10 is to be deleted (step S115). Specifically, the display control message (M5) includes the message "MESSAGE_IMAGE_ON", the IP address of the transmission destination extracted at step S114, and the IP address of the management system 50 serving as the transmission origin.

In this way, the message creation section 61 creates the communications control message (M1, M2, M3, or M4) or the display control message (M5).

Then, the transmitting-receiving section 51 of the management system 50 transmits, to the three terminals (10*aa*, 10*ba*, and 10*db*) serving as the multiple sites through the communications network 2, the communications control message (M1, M2, M3, or M4) or the display control message (M5), which is created in accordance with the image communications state of each terminal serving as the transmission side or the receiving side in telephone conversations made among the terminals (step S74). In FIG. 26, step S74-1 illustrates the transmission from the management system 50 to the terminal ba, step S74-2 illustrates the transmission from the management system 50 to the terminal db, and S74-3 illustrates the transmission from the management system 50 to the terminal aa. Steps S74-1, S74-2, and S74-3 are included in step S74.

Specifically, when step S103 is executed, the transmitting-receiving section 51 of the management system 50 transmits the communications control message (M3) created at step S104 to the IP address extracted at step S103. When step S107 is executed, the transmitting-receiving section 51 transmits the communications control message (M4) created at step S108 to the IP address extracted at step S107. When step S110 is executed, the transmitting-receiving section 51 transmits the communications control message (M1) created at step S111 to the IP address extracted at step S110. When step S112 is executed, the transmitting-receiving section 51 transmits the communications control message (M2) created at step S113 to the IP address extracted at step S112. When step S114 is executed, the transmitting-receiving section 51 transmits the communications control message (M5) created at step S115 to the IP address extracted at step S114.

As a result, each of the terminals (10*aa*, 10*ba*, and 10*db*) performs processing in accordance with the content of the communications control message (M1, M2, M3, or M4) or the display control message (M5) (steps S75-1 to S75-3).

Processing performed at steps S75-1 to S75-3 is described below with reference to FIGS. 29 to 32. FIGS. 29 to 32 are schematics illustrating examples of a television conference screen displayed on the display 120 of the terminal 10. A television conference screen P1 displayed on the display 120 includes a main screen P2, and sub screens P3 and P4. The television conference screen P1 further includes two sub screens located under the sub screen P4 and three sub screens located on the left side of the sub screen located at the lowest position from the sub screen P4. At the bottom of the television conference screen P1, displayed are a message display area P5 in which a display message is displayed, a "screen switching" button P6 that is pressed by a mouse pointer, for example, when images displayed on the main screen and the sub screens are switched, and a camera icon P7 that indicates whether the power source of the camera 112 of the terminal 10 itself is turned on and the terminal 10 performs image communications, or whether the power source of the camera 112 of the terminal 10 itself is turned off and the terminal 10 does not perform image communications. The display of "x" on the camera icon P7 means that the power source of the camera 112 of the terminal 10 itself is on and a user will be able to turn off the power source. On the other hand, no display of "x" on the camera icon P7 means that the power source of the camera 112 of the terminal 10 itself is off and a user will be able to turn on the power source.

Figure 29:
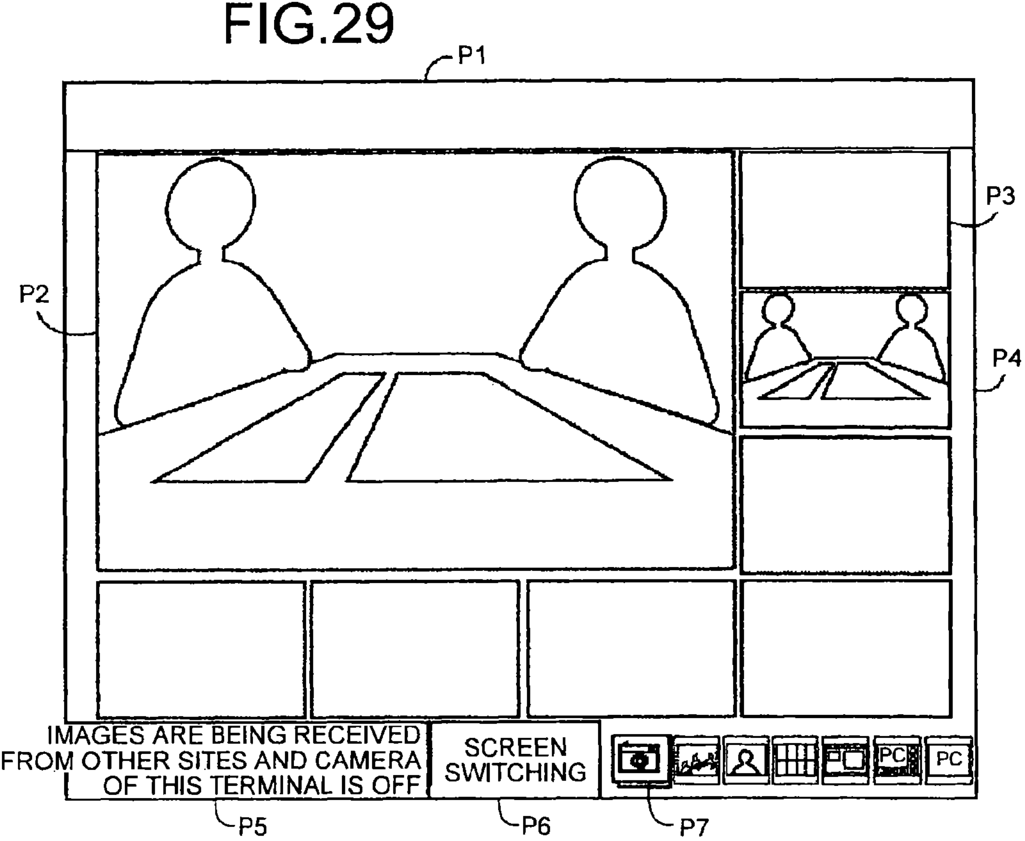
FIG. 29 is a schematic illustrating an example of a television conference screen displayed on a display of the transmission terminal.

When the communications control message (M3) indicating that the other terminals are performing image communications is created at step S104, the display control section 17 of the terminal 10 causes the display 120 to display a display message, e.g., "Images are being received from the other site and the camera of this terminal is off" in the message display area P5 as illustrated in FIG. 29. The main screen P2 displays an image of the other party as a main display and the sub screen P3 originally displays an image of the own terminal. In this case, no image is displayed on the sub screen P3. However, the sub screen P4 displays the image of the other party as a sub display.

As a result, a user can recognize the state in which the own terminal is transmitting no image data and image data is being transmitted from the other terminal by viewing the television conference screen P1 illustrated in FIG. 29. If a user wants to transmit image date from the own terminal, the user can start transmitting the image data by pressing the camera icon P7. Once the camera icon P7 is pressed, the camera icon P7 displays "x" thereon.

Figure 30:
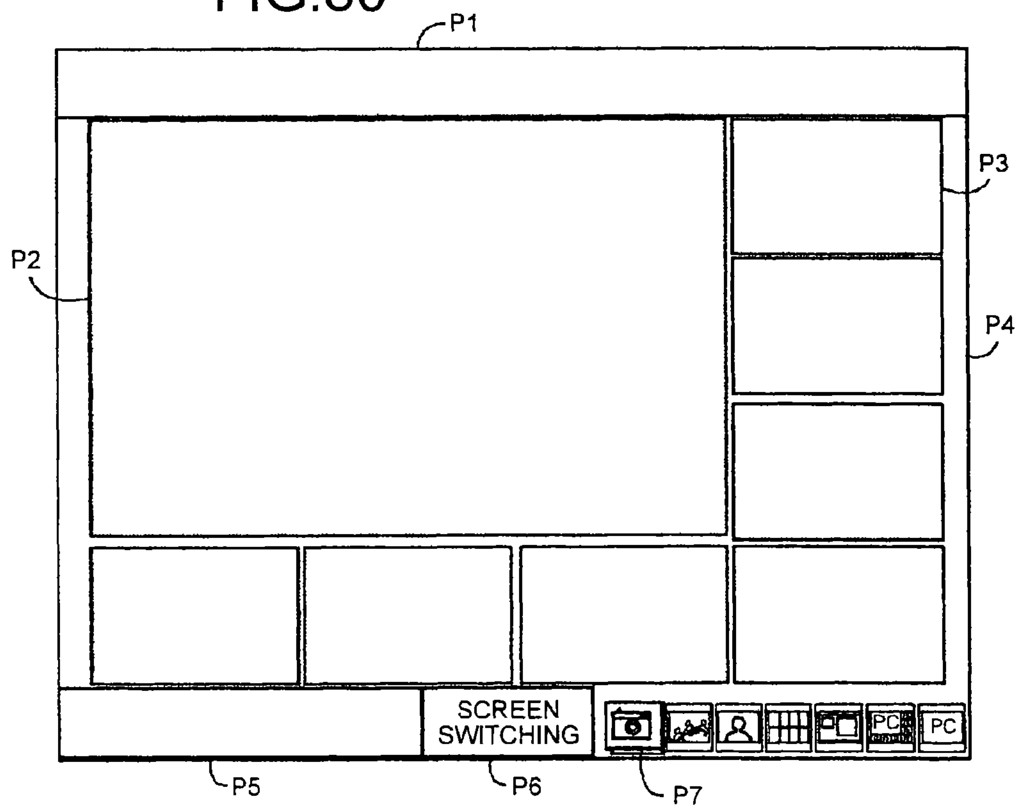
FIG. 30 is a schematic illustrating an example of the television conference screen displayed on the display of the transmission terminal.

When the communications control message (M4) indicating that image communications is to be forcibly stopped is created at step S108, the image capturing section 14 of the terminal 10 stops imaging and the transmitting-receiving section 11 stops transmitting the image data (stops image communications) on a command from the CPU 101. The display control section 17 causes the display 120 to hide displays on all of the screens P2, P3, P4, and so on of the television conference screen P1 and to delete "x" from the camera icon P7 as illustrated in FIG. 30. The image capturing section 14 includes the camera 112 illustrated in FIG. 5 and an external camera connected to the external device connection I/F.

As a result, a user can recognize the state in which the own terminal is transmitting no image data, the camera 112 of the own terminal is halting imaging, and no image data is being transmitted from the other terminal by viewing the television conference screen P1 illustrated in FIG. 30.

Figure 31:
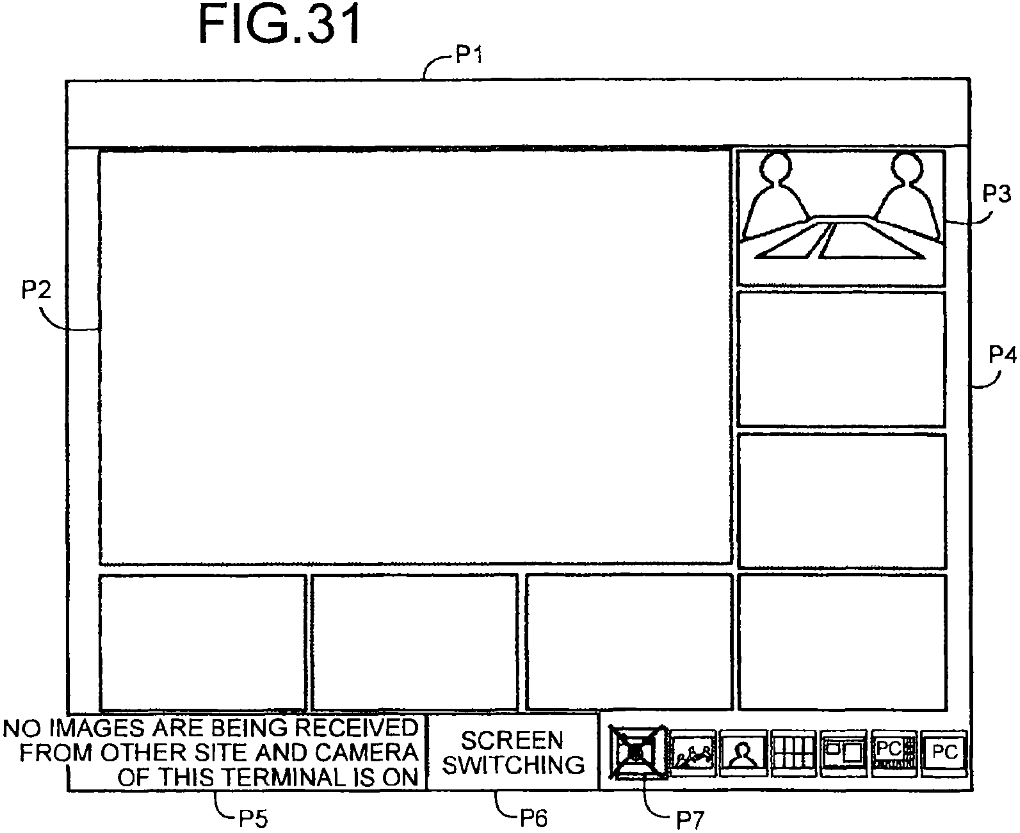
FIG. 31 is a schematic illustrating an example of the television conference screen displayed on the display of the transmission terminal.

When the communications control message (M1) indicating that all of the other terminals are halting image communications is created at step S111, the display control section 17 of the terminal 10 causes the display 120 to display a display message, e.g., "No images are being received from the other sites and the camera of this terminal is on" in the message display area P5 as illustrated in FIG. 31. In FIG. 31, nothing is displayed on the main screen P2 and the sub screen P4, and the image of the own terminal is displayed on the sub screen P3.

As a result, a user can recognize the state in which only the own terminal is transmitting image data and no image data is being transmitted from all of the other terminals by viewing the television conference screen P1 illustrated in FIG. 31.

Figure 32:
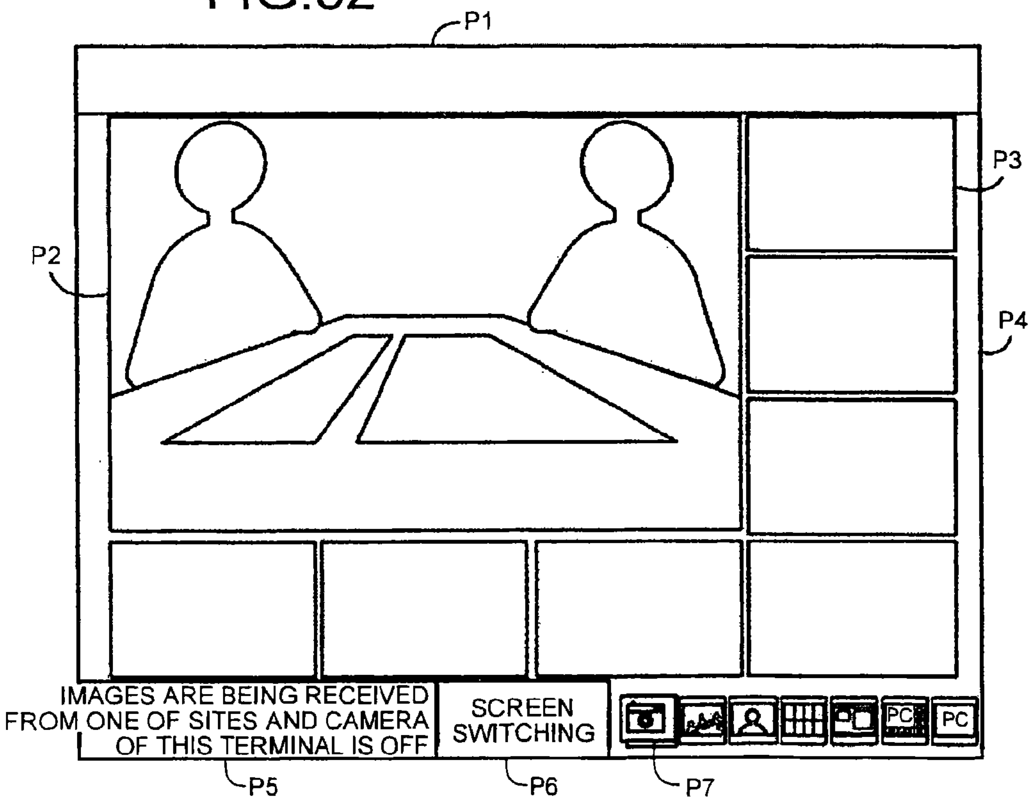
FIG. 32 is a schematic illustrating an example of the television conference screen displayed on the display of the transmission terminal.

When the communications control message (M2) indicating that the other single terminal is performing image communications is created at step S113, the display control section 17 of the terminal 10 causes the display 120 to display a display message, e.g., "images are being received from one of the sites and the camera of this terminal is off" in the message display area P5 as illustrated in FIG. 32. In FIG. 32, an image of the other party at the site is displayed on the main screen P2, and nothing is displayed on the sub screens P3 and P4.

As a result, a user can recognize the state in which the own terminal is transmitting no image data and image data is being transmitted from only one of the other terminals at the other parties by viewing the television conference screen P1 illustrated in FIG. 32.

When the image of FIG. 31 is displayed by the terminal 10 on one side and the image of FIG. 32 is displayed by another terminal 10 on the other side in this way, each user of the terminals 10 can select whether to perform image communications therebetween in accordance with both image communications states.

When the communications control message (M5) indicating that the display message is to be deleted is created at step S115, the display control section 17 of the terminal 10 deletes the display message displayed in the message display area P5.

The terminal 10 having the image communications function can transmit the image communications message not only by the processing performed at step S72 of FIG. 26 but also when the camera icon P7 is pressed during a television conference. Specifically, when a user presses the camera icon P7 in a state indicating "x" as illustrated in FIG. 31 so that the camera icon P7 becomes a state as illustrated in FIG. 29, the message creation section 20 of the terminal 10 creates the image communications state message indicating that the terminal 10 is halting image communications. When a user presses the camera icon P7 in a state as illustrated in FIG. 29 so that the camera icon P7 becomes a state indicating "x" as illustrated in FIG. 31, the message creation section 20 of the terminal 10 creates the image communications state message indicating that the terminal 10 is performing image communications.

Processing to transmit and receive image data and voice data for telephone conversations in a television conference between the request origin terminal and the destination terminal is described below with reference to FIGS. 7 and 33. The transmitting and receiving the image data and the voice data and detection of the delay time, which is described later, are processed in the same manner both in the processing for transmitting the image data and the voice data from the terminal 10*aa* to the terminal 10*db* in one direction and in the processing for transmitting the image data and the voice data from the terminal 10*db* to the terminal 10*aa* in the opposite direction. Therefore, communications in the one direction is described while the communications in the opposite direction is omitted.

The request origin terminal (terminal 10*aa*) transmits image data of a subject imaged by an image capturing section 14*a*, and voice data of a voice received by the voice input section 15*a* to the relaying apparatus 30*a* from the transmitting-receiving section 11 through the communications network 2 by the image/voice data session "sed" illustrated in FIG. 2 (step S81). In the embodiment, high image quality image data including three pieces of image data of low resolution, medium resolution, and high resolution illustrated in FIGS. 3A to 3C and voice data are transmitted. As a result, in the relaying apparatus 30*a*, the transmitting-receiving section 31 receives the image data composed of three pieces of different resolution image data and the voice data. The data quality confirmation section 33 searches the quality change management DB 3001 (refer to FIG. 10) by using the IP address "1.3.2.4" of the destination terminal (terminal 10*db*) as a searching key, extracts the image quality, which corresponds to the IP address, of the image data to be relayed, and confirms the image quality of the image data to be relayed (step S82). In the embodiment, the confirmed image quality of the image data is "high image quality", which is the same as that of the image data received by the transmitting-receiving section 31. Accordingly, the relaying apparatus 30*a* transmits the image data and the voice data to the destination terminal (terminal 10*db*) without any change by the image/voice data session sed (step S83). As a result, the transmitting-receiving section 11 of the destination terminal (terminal 10*db*) receives the high image quality image data composed of three pieces of image data of low resolution, medium resolution, and high resolution and the voice data. The display control section 17 can combine the three pieces of image data having different resolutions, cause the display 120 to display the resulting image, and cause the voice output section 15*b* to output a voice based on the voice data.

Then, the delay detection section 18 of the terminal 10*db* detects the delay time in receiving of image data received by the transmitting-receiving section 11 at a regular time intervals (e.g., every one second) (step S84). In the embodiment, the following description is made on a case in which the delay time is 200 (ms).

The transmitting-receiving section 11 of the destination terminal (terminal 10*db*) transmits the delay information indicating the delay time "200 (ms)" to the management system 50 through the communications network 2 by the management information session "sei" illustrated in FIG. 2 (step S85). As a result, the management system 50 can grasp the delay time and the IP address "1.3.2.4" of the terminal 10*db* serving as the transmission origin of the delay information.

Then, the delay time management section 60 of the management system 50 searches the terminal management DB 5003 (refer to FIG. 13) by using the IP address "1.3.2.4" of the destination terminal (terminal 10*db*) as a searching key, and extracts the terminal ID "01db" corresponding to the IP address. In addition, the delay time management section 60 stores the delay time "200 (ms)" indicated by the delay information in the field of the delay time of the record of the terminal ID "01db" in the session management table of the session management DB 5005 (refer to FIG. 15) and manages it (step S86).

Then, the quality determination section 58 searches the quality management DB 5007 (refer to FIG. 18) by using the delay time "200 (ms)" as a searching key, extracts the image quality "medium image quality" of the image data corresponding to the delay time, and determines the image quality as the "medium image quality" (step S87).

Then, the transmitting-receiving section 51 searches the relaying apparatus management DB 5001 (refer to FIG. 11) by using the relaying apparatus ID "111a" associated with the terminal ID "01db" in the session management table of the session management DB (refer to FIG. 15) as a searching key, and extracts the IP address "1.2.1.2" of the relaying apparatus 30*a* corresponding to the relaying apparatus ID (step S88). The transmitting-receiving section 51 transmits the quality information indicating the image quality "medium image quality" of the image data determined at step S87 to the relaying apparatus 30*a* through the communications network 2 by the management information session sei illustrated in FIG. 2 (step S89). The quality information includes the IP address "1.3.2.4" of the destination terminal (terminal 10*db*) used as the searching key at step S86. As a result, the quality change management section 34 of the relaying apparatus 30*a* stores the IP address "1.3.2.4" of the terminal 10 serving as the transmission destination (in this case, the terminal 10*db*) and the image quality "medium image quality" of the image data to be relayed in the quality change management DB 3001 (refer to FIG. 10) and manages them in association with each other (step S90).

Then, the terminal 10*aa* transmits the high image quality image data composed of three pieces of image data of low resolution, medium resolution, and high resolution and the voice data to the relaying apparatus 30*a* by the image/voice data session "sed" in the same manner as step S81 (step S91). As a result, the data quality confirmation section 33 of the relaying apparatus 30*a* searches the quality change management DB 3001 (refer to FIG. 10) by using the IP address "1.3.2.4" of the destination terminal (terminal 10*db*) as a searching key, extracts the image quality "medium image quality", which corresponds to the IP address, of the image data to be relayed, and confirms the image quality of the image data to be relayed in the same manner as step S82 (step S92). In the embodiment, the confirmed image quality of the image data is "medium image quality", which is lower than the image quality "high image quality" of the image data received by the transmitting-receiving section 31. Therefore, the data quality change section 35 changes the image quality of the image data by suppressing the image quality of the image data from "high image quality" to "medium image quality" (step S93).

Then, the transmitting-receiving section 31 transmits the image data the image quality of which has been changed to "medium image quality" and the voice data the sound quality of which has not been changed to the terminal 10*db* through the communications network 2 by the image/voice data session sed (step S94). As a result, the transmitting-receiving section 11 of the destination terminal (terminal 10*db*) receives the medium image quality image data composed of two pieces of image data of low resolution and medium resolution, and the voice data. Then, the display control section 17 can combine the two pieces of image data having different resolutions, cause the display 120 to display the resulting image, and cause the voice output section 15*b* to output a voice based on the voice data.

In this way, when delay in receiving occurs in the destination terminal (terminal 10*db*) that receives image data, the relaying apparatus 30*a* changes the image quality such that persons who are attending in a television conference feel no strangeness in the image.

<<Major Effect of Embodiment>>

As described above, in the embodiment, the management system 50 creates the specified communications control message for causing the specified terminal 10 to control image communications in accordance with the pieces of image communications state information indicating the image communications states of the terminals 10, and transmits the communications control message to the terminal 10 that is caused to control the image communications. Accordingly, the transmission management system can cause the specified transmission terminal to perform image communications in accordance with the image communications state of the terminal 10 on the other parties' side. As a result, the transmission management system can prevent unnecessary image communications. In addition, unnecessary power consumption and communications costs are eliminated.

It is difficult to grasp the environment of the whole of the Internet 2*i* while the environment of the LAN 2 such as the IP address of the relaying apparatus 30 can be grasped in the communications network 2. Therefore, at first, two or more relaying apparatuses 30 are selected among the relaying apparatuses 30 that relay image data and voice data in accordance with information of a graspable environment. Then, the prior transmission information is transmitted and received between the terminals 10 instead of image data and voice data before the image data and voice data are practically transmitted and received. As a result, the relaying apparatus 30 that can actually relay the prior transmission information with the shortest period of time can be selected.

That is, two or more relaying apparatuses 30 having the top two or more IP addresses similar to any of the IP addresses of the terminals 10 are selected. As a result, two or more candidates of the relaying apparatus 30 finally to be used can remain. Thereafter, the prior transmission information is practically transmitted and received between the request origin terminal and the destination terminal through each of the relaying apparatuses 30 serving as the candidates. As a result, the relaying apparatus 30 that has relayed the prior transmission information with the shortest necessary period of time for transmitting and receiving can be selected among two or more relaying apparatuses 30 serving as the candidates. Consequently, the highest quality image data or voice data under the environment of the current communications network 2 can be transmitted and received.

In the embodiment, two or more relaying apparatuses 30 are selected not only by preferentially selecting the relaying apparatus 30 having the IP address similar to any of the IP addresses of the terminals 10 performing a television conference but also taking the maximum data transmission speed of each relaying apparatus 30 into consideration. As a result, the candidates of the relaying apparatus 30 can be selected that fit the actual environment of the communications network 2.

In the embodiment, the relaying apparatuses 30 are selected among the relaying apparatuses 30 in online. As a result, the candidates of the relaying apparatus 30 can be selected that fit the actual environment of the communications network 2.

[Supplemental Explanation of Embodiment]

The relaying apparatus 30, the management system 50, the program supply system 90, and the maintenance system 100 in the embodiment may be structured by a single computer. The sections (functions or means) of them may be divided and the divided sections may be structured by a plurality of computers each allocated for any section. When the program supply system 90 is structured by a single computer, a program transmitted by the program supply system 90 may be transmitted as a plurality of divided modules or transmitted without being divided. When the program supply system 90 is structured by a plurality of computers, a program may be transmitted from the computers as a plurality of divided modules.

The recording medium, such as CD-ROM, in which the terminal program, the relaying apparatus program, and the transmission management program of the embodiment are stored, the HD 204 that stores therein the programs, and the program supply system 90 including the HD 204 are used as program products when the terminal program, the relaying apparatus program, and the transmission management program are provided to a user and the like in domestically or overseas.

As an example of quality of an image represented by image data relayed by the relaying apparatus 30, attention is paid on the resolution of the image represented by the image data and the resolution is managed by the quality change management table illustrated in FIG. 10 and the quality management table illustrated in FIG. 18. The image quality is not limited to the resolution. As other examples of quality, attention may be paid on depth of image quality of the image represented by the image data, a sampling frequency of a voice in voice data, and a bit length of a voice in voice data and the quality may be managed. Voice data may be transmitted and received by being divided into three pieces of data having different resolutions (high resolution, medium resolution, and low resolution).

In FIGS. 11, 13, and 15, the receiving date is managed. The management item is not limited to the receiving date. At least receiving time may be managed in the receiving date.

In the embodiment, the IP address of the relaying apparatus is managed in FIG. 11 while the IP address of the terminal is managed in FIG. 13. However, the management item is not limited to the IP address. Each FQDN (Fully Qualified Domain Name) of the relaying apparatus and the terminal may be managed as relay apparatus identification information for identifying the relaying apparatus 30 on the communications network 2 or terminal identification information for identifying the terminal 10 on the communications network 2. In this case, the IP address corresponding to the FQDN is acquired by a known DNS (Domain Name System) server. The expression of "the relaying apparatus identification information for identifying the relaying apparatus 30 on the communications network 2" may be also expressed as "the relaying apparatus connection destination information indicating the connection destination to the relaying apparatus 30 on the communications network 2" or "the relaying apparatus destination information indicating the destination to the relaying apparatus 30 on the communications network 2". Likewise, the expression of "the terminal identification information for identifying the terminal 10 on the communications network 2" may be also expressed as "the terminal connection destination information indicating the connection destination to the terminal 10 on the communications network 2" or "the terminal destination information indicating the destination to the terminal 10 on the communications network 2".

In the embodiment, the television conference system is described as an example of the transmission system 1. However, the transmission system 1 is not limited to be applied to the television conference system. The transmission system 1 may be applicable to a telephone system such as an IP (Internet Protocol) telephone and an Internet telephone. The transmission system 1 may be a car navigation system. In this case, the terminal 10 on one side corresponds to a car navigation system mounted on a vehicle while the terminal 10 on the other side corresponds to a management server or management terminal of a management center that manages the car navigation or another car navigation system mounted on another vehicle. The transmission system 1 may be a communication system of cell phones. In this case, the terminal 10 corresponds to the cell phone, for example.

In the embodiment, image data and voice data are described as an example of the content data. However, the data is not limited to the image data and the voice data. Touch data may be applicable. In this case, a sense of touch obtained by a user at a terminal on one side is transmitted to another terminal on the other side. The content data may be olfaction (smell) data. In this case, an aroma (smell) at a terminal on one side is transmitted to another terminal on the other side. The content data may be at least one piece of image data, voice data, touch data, and olfaction data.

In the embodiment, the television conference is held by using the transmission system 1. However, the transmission system 1 is not limited to be used for the television conference. The transmission system 1 may be used for meetings, general conversations among family members or friends or information supply in one direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A transmission management system, comprising:

a plurality of transmission terminals configured to perform at least voice communications;

a memory configured to store image communications state information indicating a state related to image communications of each of the transmission terminals; and a transmitter configured to, when at least voice communications are performed among the transmission terminals, transmit control information created based on image communications states of the transmission terminals attending the voice communications to the transmission terminals, wherein each of the transmission terminals that has received the control information displays, on a screen of the each of the transmission terminals, an image communications state of another transmission terminal performing the voice communications with each of the transmission terminals based on the control information when the voice communications is performed.

2. The transmission management system according to claim 1, further comprising processing circuitry configured to create the control information based on the image communications state information stored in the memory, wherein the transmitter transmits the created control information to the transmission terminals attending the voice communications.

3. The transmission management system according to claim 1, further comprising processing circuitry, wherein in a first case in which the image communications state information indicates that a single transmission terminal is performing image communications and one or more other transmission terminals are halting image communications among the transmission terminals, the processing circuitry creates a first communications control message indicating that the one or more other transmission terminals are halting image communications and a second communications control message indicating that the single transmission terminal is performing image communications, and the transmitter transmits the first communications control message to the single transmission terminal that is performing image communications and the second communications control message to the one or more other transmission terminals that are halting image communications.

4. The transmission management system according to claim 1, further comprising processing circuitry, wherein in a second case in which the image communications state information indicates that more than one of the transmission terminals are performing image communications and one or more other transmission terminals are halting image communications among the transmission terminals, the processing circuitry creates a third communications control message indicating that the more than one of the transmission terminals are performing image communications, and the transmitter transmits the third communications control message to the one or more other transmission terminals that are halting image communications.

5. The transmission management system according to claim 1, further comprising processing circuitry, wherein in a third case in which the image communications state information indicates that a single transmission terminal is performing image communications and one or more other transmission terminals have no image communications function among the transmission terminals, the processing circuitry creates a fourth communications control message indicating that the image communications is to be forcibly stopped, and the transmitter transmits the fourth communications control message to the single transmission terminal that is performing image communications.

6. The transmission management system according to claim 1, further comprising processing circuitry, wherein in a fourth case in which the image communications state information does not correspond to any of a first case in which the image communications state information indicates that a single transmission terminal is performing image communications and one or more other transmission terminals are halting image communications among the transmission terminals, a second case in which the image communications state information indicates that more than one of the transmission terminals are performing image communications and one or more other transmission terminals are halting image communications among the transmission terminals, and a third case in which the image communications state information indicates that a single transmission terminal is performing image communications and one or more other transmission terminals have no image communications function among the transmission terminals, the processing circuitry creates a display control message indicating that specified display messages displayed on the transmission terminals are to be deleted, and the transmitter transmits the display control message to the transmission terminals.

7. A transmission system, comprising:

the transmission management system according to claim 3; and the transmission terminals whose image communications are managed by the transmission management system, wherein each of the transmission terminals includes:

a receiver that receives a communications control message transmitted from the transmission management system; and one or more processors that causes a specified display to display a display message based on the received communications control message.

8. A transmission system, comprising:

the transmission management system according to claim 5; and the transmission terminals whose image communications are managed by the transmission management system, wherein each of the transmission terminals includes:

a receiver that receives a communications control message transmitted from the transmission management system; and one or more processors that causes the transmission terminal to stop performing image communications in accordance with the received communications control message.

9. The transmission system according to claim 8, wherein the one or more processors causes an imaging circuit imaging a subject and obtaining image data to be subjected to the image communications to stop the imaging in accordance with the communications control message received by the receiver.

10. A transmission system, comprising:

the transmission management system according to claim 6; and the transmission terminals whose image communications are managed by the transmission management system, wherein each of the transmission terminals includes:

a receiver that receives a display control message transmitted from the transmission management system; and one or more processors that causes a specified display to delete the specified display message displayed on the specified display in accordance with the received display control message.

11. The transmission management system according to claim 2, further comprising a receiver configured to receive the image communications state information from any one of the transmission terminals, wherein the processing circuitry creates the control information based on the received image communications state information and rewrites the received image communications in the memory so that the received image communications state information is associated with a corresponding transmission terminal.

12. The transmission management system according to claim 2, wherein a video conference is performed among the transmission terminals, and each of the transmission terminals that has received the control information displays, on a screen for the video conference of the each of the transmission terminals, a message indicating an image communications state of another transmission terminal performing the voice communications with the each of the transmission terminals.

13. The transmission management system according to claim 2, wherein each of the transmission terminals that has received the control information displays, on a screen of the each of the transmission terminals, an image communications state of another transmission terminal performing the voice communications with the each of the transmission terminals and a state of an image capturing device included in the each of the transmission terminals.

14. A method, comprising:

storing image communications state information indicating a state related to image communications of each of a plurality of transmission terminals configured perform at least voice communications; and when at least voice communications are performed among the transmission terminals, transmitting control information created based on image communications states of the transmission terminals attending the voice communications to the transmission terminals, wherein each of the transmission terminals that has received the control information displays, on a screen of the each of the transmission terminals, an image communications state of another transmission terminal performing the voice communications with each of the transmission terminals based on the control information when the voice communications is performed.

15. A non-transitory computer-readable medium storing program instructions which, when executed by processing circuitry, cause the processing circuitry to perform a method comprising:

storing image communications state information indicating a state related to image communications of each of a plurality of transmission terminals configured to perform at least voice communication; and when at least voice communications are performed among the transmission terminals, transmitting control information created based on image communications states of the transmission terminals attending the voice communications to the transmission terminals, wherein each of the transmission terminals that has received the control information displays, on a screen of the each of the transmission terminals, an image communications state of another transmission terminal performing the voice communications with each of the transmission terminals based on the control information when the voice communications is performed.

* * * * *